(12) United States Patent
Huh et al.

(10) Patent No.: US 12,650,575 B2
(45) Date of Patent: Jun. 9, 2026

(54) OPTICAL IMAGING SYSTEM AND CAMERA MODULE INCLUDING THE SAME

(71) Applicant: Samsung Electro-Mechanics Co., Ltd., Suwon-si (KR)

(72) Inventors: Jae Hyuk Huh, Suwon-si (KR); Jin Se Kim, Suwon-si (KR); Yong Joo Jo, Suwon-si (KR); Hyo Jin Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/507,357

(22) Filed: Nov. 13, 2023

(65) Prior Publication Data

US 2024/0094504 A1      Mar. 21, 2024

Related U.S. Application Data

(63) Continuation of application No. 17/005,765, filed on Aug. 28, 2020, now Pat. No. 11,852,896.

(30) Foreign Application Priority Data

Aug. 30, 2019      (KR) ........................ 10-2019-0107774

(51) Int. Cl.
*G02B 9/60* (2006.01)
*G02B 13/00* (2006.01)
(Continued)

(52) U.S. Cl.
CPC ........... *G02B 9/60* (2013.01); *G02B 13/0045* (2013.01); *G02B 3/04* (2013.01); *G02B 5/208* (2013.01)

(58) Field of Classification Search
None
See application file for complete search history.

(56) References Cited

U.S. PATENT DOCUMENTS

| | | | |
|---|---|---|---|
| 8,176,614 B2 | 5/2012 | Welch | |
| 8,964,309 B2 | 2/2015 | Uchida et al. | |
| (Continued) | | | |

FOREIGN PATENT DOCUMENTS

| | | |
|---|---|---|
| CN | 207164345 U | 3/2018 |
| CN | 108254997 A | 7/2018 |
| (Continued) | | |

OTHER PUBLICATIONS

Korean Office Action issued on Jan. 11, 2024, in counterpart Korean Patent Application No. 10-2022-0104229 (10 pages in English, 8 pages in Korean).

(Continued)

*Primary Examiner* — Darryl J Collins
(74) *Attorney, Agent, or Firm* — NSIP Law

(57)      ABSTRACT

An optical imaging system includes a first lens, a second lens, a third lens, a fourth lens, and a fifth lens sequentially disposed along an optical axis from an object-side surface of the first lens toward an imaging plane of an image sensor, wherein 3.5≤TTL/IMG HT, f1+f2l<2.0 mm, and 0.7≤L1S1es/L1S1el<1.0 are satisfied, where TTL is a distance along the optical axis from the object-side surface of the first lens to the imaging plane of the image sensor, IMG HT is one-half of a diagonal length of the imaging plane of the image sensor, f1 is a focal length of the first lens, f2 is a focal length of the second lens, L1S1el is a maximum effective radius of the object-side surface of the first lens, and L1S1es is a minimum effective radius of the object-side surface of the first lens.

17 Claims, 18 Drawing Sheets

600

(51) Int. Cl.
*G02B 3/04*  (2006.01)
*G02B 5/20*  (2006.01)

(56)  References Cited

U.S. PATENT DOCUMENTS

| | | | | |
|---|---|---|---|---|
| 10,175,458 | B2 * | 1/2019 | Tseng | ................. G02B 13/0065 |
| 10,288,845 | B2 | 5/2019 | Chen et al. | |
| 10,379,322 | B2 * | 8/2019 | Wu | ....................... G02B 13/146 |
| 10,436,954 | B2 | 10/2019 | Shih et al. | |
| 2002/0114085 | A1 | 8/2002 | Hattori et al. | |
| 2014/0063596 | A1 | 3/2014 | Jung et al. | |
| 2014/0218584 | A1 | 8/2014 | Liou et al. | |
| 2014/0307148 | A1 | 10/2014 | Chen et al. | |
| 2014/0368723 | A1 | 12/2014 | Jung et al. | |
| 2015/0077864 | A1 | 3/2015 | Noda et al. | |
| 2015/0109485 | A1 | 4/2015 | Ozaki et al. | |
| 2016/0139359 | A1 | 5/2016 | Lin et al. | |
| 2017/0261725 | A1 | 9/2017 | Lai et al. | |
| 2017/0276906 | A1 | 9/2017 | Gong et al. | |
| 2017/0351064 | A1 | 12/2017 | Chang et al. | |
| 2018/0045916 | A1 | 2/2018 | Chang et al. | |
| 2018/0180847 | A1 | 6/2018 | Yoo | |
| 2018/0188501 | A1 | 7/2018 | Lee et al. | |
| 2018/0335610 | A1 | 11/2018 | Chen et al. | |
| 2018/0364455 | A1 | 12/2018 | Chen et al. | |
| 2019/0064481 | A1 | 2/2019 | Zhang et al. | |
| 2019/0072745 | A1 | 3/2019 | Chen et al. | |
| 2019/0146182 | A1 | 5/2019 | Liao et al. | |
| 2020/0150406 | A1 | 5/2020 | Chen et al. | |
| 2021/0389570 | A1 | 12/2021 | Wang et al. | |

FOREIGN PATENT DOCUMENTS

| | | |
|---|---|---|
| CN | 109298514 A | 2/2019 |
| CN | 109725407 A | 5/2019 |
| CN | 110161659 A | 8/2019 |
| KR | 10-2014-0146980 A | 12/2014 |
| TW | 201350957 A | 12/2013 |
| TW | 201706666 A | 2/2017 |
| TW | 201713980 A | 4/2017 |
| TW | 201905531 A | 2/2019 |
| TW | I659239 B | 5/2019 |

OTHER PUBLICATIONS

Taiwanese Office Action issued on Aug. 9, 2024, in counterpart Taiwanese Patent Application No. 113125572 (6 pages in English, 5 pages in Chinese).

Chinese Office Action issued on Jan. 13, 2024, in counterpart Chinese Patent Application No. 202210974941.X (3 pages in English, 6 pages in Chinese).

Korean Office Action issued on Jul. 19, 2024, in counterpart Korean Patent Application No. 10-2022-0104229 (9 pages in English, 7 pages in Korean).

Taiwanese Office Action issued on Oct. 13, 2023, in counterpart Taiwanese Patent Application No. 112113457 (8 pages in English, 6 pages in Chinese).

Korean Office Action issued on Nov. 19, 2021, in counterpart Korean Patent Application No. 10-2020-0109417 (9 pages in English, 7 pages in Korean).

Taiwanese Office Action issued on Jul. 15, 2021, in counterpart Taiwanese Patent Application No. 109129732 (8 pages in English and 9 pages in Chinese).

Indian Office Action issued on Dec. 6, 2021, in counterpart Indian Patent Application No. 202014037300 (7 pages in English).

Taiwanese Office Action issued on Jun. 6, 2022, in counterpart Taiwanese Patent Application No. 111104716 (4 pages in English, 4 pages in Mandarin).

Taiwanese Office Action issued on Sep. 5, 2025, in counterpart Taiwanese Patent Application No. 114122300 (7 pages in English, 6 pages in Chinese).

* cited by examiner

100

200

300

400

500

<u>600</u>

610 620 630 640 650 660    670

R

700

700

800

800

1212a 1211a

1210

1212a 1211a

1210

1212a  1211a

1210

OPTICAL IMAGING SYSTEM AND CAMERA MODULE INCLUDING THE SAME

CROSS-REFERENCE TO RELATED APPLICATIONS

This application is a continuation of application Ser. No. 17/005,765 filed on Aug. 28, 2020, now U.S. Pat. No. 11,852,896 issued on Dec. 26, 2023, and claims the benefit under 35 USC 119(a) of Korean Patent Application No. 10-2019-0107774 filed on Aug. 30, 2019, in the Korean Intellectual Property Office, the entire disclosures of which are incorporated herein by reference for all purposes.

BACKGROUND

1. Field

This application relates to an optical imaging system and a camera module including the same.

2. Description of Related Art

Cameras are provided in portable electronic devices such as smartphones, and as portable electronic devices have been miniaturized, there has been a need to miniaturize cameras mounted in portable electronic devices.

Furthermore, a telephoto camera has been provided in portable electronic devices to obtain a telephone effect for imaging a subject with a narrow angle of view.

However, when a plurality of lenses are disposed in the thickness direction of the portable electronic device as in the related art, the thickness of the portable electronic device increases as the number of lenses increases, so there may be a problem that a desired size of the portable electronic device cannot be obtained.

In detail, since a telephoto camera has a relatively long focal length, there is a problem that it may be difficult to provide a telephoto camera in a thin portable electronic device.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, and a fifth lens sequentially disposed in ascending numerical order along an optical axis from an object-side surface of the first lens toward an imaging plane of an image sensor, wherein the first lens has a positive refractive power, a non-circular shape when the first lens is viewed in a direction of the optical axis, a first axis intersecting the optical axis and perpendicular to the optical axis, and a second axis intersecting the optical axis and perpendicular to the optical axis and the first axis, a length of the first axis being greater than a length of the second axis, and the conditional expressions $3.5 \leq TTL/IMG\ HT$, $|f1+f2| < 2.0$ mm, and $0.7 \leq L1S1es/L1S1el < 1.0$ are satisfied, where TTL is a distance along the optical axis from the object-side surface of the first lens to the imaging plane of the image sensor, IMG HT is one-half of a diagonal length of the imaging plane of the image sensor, f1 is a focal length of the first lens, f2 is a focal length of the second lens, L1S1el is a maximum effective radius of the object-side surface of the first lens when the first lens is viewed in the direction of the optical axis, and L1S1es is a minimum effective radius of the object-side surface of the first lens when the first lens is viewed in the direction of the optical axis.

The conditional expression $0.8 \leq TTL/f \leq 1.25$ may be satisfied, where TTL is a distance along the optical axis from the object-side surface of the first lens to the imaging plane of the image sensor, and f is a total focal length of the optical imaging system.

The optical imaging system may further include a first reflective member disposed between an object side of the optical imaging system and the object-side surface of the first lens, wherein the first reflective member may include a reflective surface configured to receive incident light from an object and reflect the incident light toward the object-side surface of the first lens.

The conditional expression $0 < L1S1el/PTTL < 0.14$ may be satisfied, where PTTL is a distance along the optical axis from the reflective surface of the first reflective member to the imaging plane of the image sensor.

The first lens may include an optical portion exhibiting a lens characteristic of the first lens; and a flange portion not exhibiting a lens characteristic of the first lens and extending from an edge of at least a portion of the optical portion in a direction away from the optical axis, and the conditional expression $0 < AL1/(PTTL)^2 < 0.05$ may be satisfied, where AL1 is an area of the optical portion of the object-side surface of the first lens when the first lens is viewed in a direction of the optical axis, and PTTL is a distance along the optical axis from the reflective surface of the first reflective member to the imaging plane of the image sensor.

The optical imaging system may further include a second reflective member disposed in an optical path between the image-side surface of the fifth lens and the image sensor, wherein the second reflective member may include a reflective surface configured to receive light from the fifth lens and reflect the light toward the image sensor.

The first lens may include an optical portion exhibiting a lens characteristic of the first lens; and a flange portion not exhibiting a lens characteristic of the first lens and extending from an edge of at least a portion of the optical portion in a direction away from the optical axis, the optical portion may include a first edge and a second edge disposed on opposite sides of the optical axis in a first direction; and a third edge and a fourth edge disposed on opposite sides of the optical axis in a second direction perpendicular to the first direction, the third edge may connect a first end of the first edge to a first end of the second edge, the fourth edge may connect a second end of the first edge to a second end of the second edge, and a shortest distance between the first edge and the second edge may be greater than a shortest distance between the third edge and the fourth edge.

The conditional expression $0° < \alpha < 92°$ may be satisfied, where $\alpha$ is an angle between a first virtual line connecting a connection point between the second end of the first edge and the fourth edge to the optical axis, and a second virtual line connecting a connection point between the second end of the second edge and the fourth edge to the optical axis.

The conditional expression $0.8 < BFL/(2*IMG\ HT) < 2.5$ may be satisfied, where BFL is a distance along the optical axis from an image-side surface of the fifth lens to the imaging plane of the image sensor.

The conditional expression $3.2 \leq n2+n3$ may be satisfied, where n2 is a refractive index of the second lens, and n3 is a refractive index of the third lens.

The conditional expression $0 \leq D12/f \leq 0.07$ may be satisfied, where D12 is a distance along the optical axis from an image-side surface of the first lens to an object-side surface of the second lens, and f is a total focal length of the optical imaging system.

The conditional expression $0.2 \leq R1/f \leq 0.6$ may be satisfied, where R1 is a radius of curvature of the object-side surface of the first lens, and f is a total focal length of the optical imaging system.

The optical imaging system may further include a spacer disposed between the first lens and the second lens and including an opening through which light passes from the first lens to the second lens, and the opening may have a non-circular shape when the opening is viewed in the direction of the optical axis, wherein the conditional expression $0.7 \leq s1es/s1el < 1.0$ may be satisfied, where s1el is a maximum radius of the opening when the opening is viewed in the direction of the optical axis, and s1es is a minimum radius of the opening when the opening is viewed in the direction of the optical axis.

The second lens may have a negative refractive power.

The third lens may have a positive refractive power, the fourth lens may have a negative refractive power, and the fifth lens may have a positive refractive power or a negative refractive power.

The third lens, the fourth lens, and the fifth lens each may have a positive refractive power.

The third lens may have a negative refractive power, and the fourth lens may have a negative refractive power and the fifth lens may have a positive refractive power, or the fourth lens may have a positive refractive power and the fifth lens may have a negative refractive power.

A portable electronic device may include a first camera module including the optical imaging system of the one general aspect described above, a second camera module; and a third camera module, wherein the image sensor of the first camera module may be configured to convert light incident onto the image sensor through the first to fifth lenses of the first camera module into an electrical signal, the optical axis of the first camera module may be oriented in a first direction, and an optical axis of the second camera module and an optical axis of the third camera module may be oriented in a second direction different from the first direction.

The first camera module may have a first angle of view and a first focal length, the second camera module may have a second angle of view wider than the first angle of view and a second focal length shorter than the first focal length, and the third camera module may have a third angle of view wider than the second angle of view and a third focal length shorter than the second focal length.

In another general aspect, a camera module includes a housing; a lens module disposed in the housing and including a lens barrel and a plurality of lenses disposed in the lens barrel; and a first reflective member disposed in the housing and including a reflective surface configured to receive incident light from an object and reflect the incident light toward an object side of the lens module, wherein the plurality of lenses include a first lens, a second lens, a third lens, a fourth lens, and a fifth lens sequentially disposed in ascending numerical order along an optical axis from the object side of the lens barrel toward an imaging plane of an image sensor, the first lens has a positive refractive power, a non-circular shape when the first lens is viewed in a direction of the optical axis, a first axis intersecting the optical axis and perpendicular the optical axis, and a second axis intersecting the optical axis and perpendicular to the optical axis and the first axis, a length of the first axis being greater than a length of the second axis, and the conditional expressions $3.5 \leq TTL/IMG\ HT$, $|f1+f2| < 2$ mm, and $0.7 \leq L1S1es/L1S1el < 1.0$ are satisfied, where TTL is a distance along the optical axis from an object-side surface of the first lens to the imaging plane of the image sensor, IMG HT is one-half of a diagonal length of the imaging plane of the image sensor, f1 is a focal length of the first lens, f2 is a focal length of the second lens, L1S1el is a maximum effective radius of the object-side surface of the first lens when the first lens is viewed in the direction of the optical axis, and L1S1es is a minimum effective radius of the object-side surface of the first lens when the first lens is viewed in the direction of the optical axis.

The optical imaging system may further include a second reflective member disposed in an optical path between the image-side surface of the fifth lens and the image sensor, wherein the second reflective member may include a reflective surface configured to receive light from the fifth lens and reflect the light toward the image sensor.

One surface of the housing may include an opening exposing the lens barrel and at least a portion of the first reflective member, the camera module may further include a cover covering the opening in the one surface of the housing so that the lens barrel is covered by the cover and there is a space between the cover and a surface of the lens barrel facing the cover, the cover may include an opening exposing at least a portion of the first reflective member to enable the first reflective member to receive the incident light from the object, and the surface of the lens barrel facing the cover may include a light blocking portion configured to block a portion of the light reflected by the first reflective member and incident on the space between the cover and the surface of the lens barrel facing the cover from passing through the space between the cover and the surface of the lens barrel facing the cover.

The light blocking portion may include a plurality of protrusions disposed on the surface of the lens barrel facing the cover.

The light blocking portion may include a first protrusion and a second protrusion each disposed on the surface of the lens barrel facing the cover, the first protrusion and the second protrusion each may include a plurality of grooves, and when the light blocking portion is viewed in the direction of the optical axis, the grooves of the first protrusion and the grooves of the second protrusion are offset from each other.

The light blocking portion may include a plurality of protrusions disposed on the surface of the lens barrel facing the cover and spaced apart from each other in the direction of the optical axis.

Each of the protrusions may extend in a direction perpendicular to the optical axis, and may include a groove formed in a surface of the protrusion facing the cover, the groove extending in the direction of the optical axis.

A width of the groove may be widest at the surface of the protrusion facing the cover, and decrease in a direction away from the surface of the protrusion facing the cover.

The grooves of the protrusions have a polygonal shape, an arc shape, or an undulating shape.

The groove of one of the protrusions may be offset in the direction perpendicular to the optical axis with respect to the groove of another one of the protrusions so that the groove of the one of the protrusions is blocked by a non-groove portion of the other one of the protrusions when the light blocking portion is viewed in the direction of the optical axis.

The groove of one of the protrusions may be offset in the direction perpendicular to the optical axis with respect to the groove of another one of the protrusions so that the groove of the one of the protrusions is partially blocked by a non-groove portion of the other one of the protrusions when the light blocking portion is viewed in the direction of the optical axis.

Each of the protrusions may extend in a direction perpendicular to the optical axis, and may include a plurality of grooves formed in a surface of the protrusion facing the cover, the grooves extending in the direction of the optical axis.

A spacing between the grooves of one of the protrusions may be different from a spacing between the grooves of another one of the protrusions.

A number of the grooves of one of the protrusions may be different from a number of the grooves of another one of the protrusions.

The grooves of one of the protrusions may be offset in the direction perpendicular to the optical axis with respect to the grooves of another one of the protrusions so that the grooves of the one of the protrusions are blocked by a non-groove portion of the other one of the protrusions when the light blocking portion is viewed in the direction of the optical axis.

The grooves of one of the protrusions may be offset in the direction perpendicular to the optical axis with respect to the grooves of another one of the protrusions so that the grooves of the one of the protrusions are partially blocked by a non-groove portion of the other one of the protrusions when the light blocking portion is viewed in the direction of the optical axis.

The light blocking portion may include a first protrusion disposed on the surface of the lens barrel facing the cover; a second protrusion disposed on the surface of the lens barrel facing the cover; and a third protrusion disposed on the surface of the lens barrel facing the cover, wherein the first protrusion, the second protrusion, and the third protrusion may be spaced apart from each other in the direction of the optical axis.

The first protrusion may extend in a direction perpendicular to the optical axis, and may include a first groove formed in a surface of the first protrusion facing the cover, the first groove extending in the direction of the optical axis, the second protrusion may extend in the direction perpendicular to the optical axis, and may include a second groove formed in a surface of the second protrusion facing the cover, the second groove extending in the direction of the optical axis, and the third protrusion may extend in the direction perpendicular to the optical axis, and may include a third groove formed in a surface of the third protrusion facing the cover, the third groove extending in the direction of the optical axis.

The first groove of the first protrusion may be offset in the direction perpendicular to the optical axis with respect to the second groove of the second protrusion so that the first groove is blocked by a non-groove portion of the second protrusion when the light blocking portion is viewed in the direction of the optical axis, and the second groove of the second protrusion may be offset in the direction perpendicular to the optical axis with respect to the third groove of the third protrusion so that the second groove is blocked by a non-groove portion of the third protrusion when the light blocking portion is viewed in the direction of the optical axis.

The first groove of the first protrusion may be offset in the direction perpendicular to the optical axis with respect to the second groove of the second protrusion so that the first groove is partially blocked by a non-groove portion of the second protrusion when the light blocking portion is viewed in the direction of optical axis, and the second groove of the second protrusion may be offset in the direction perpendicular to the optical axis with respect to the third groove of the third protrusion so that the second groove partially is blocked by a non-groove portion of the third protrusion when the light blocking portion is viewed in the direction of the optical axis.

A portable electronic device may include the camera module of the other general aspect described above as a first camera module; a second camera module; and a third camera module, wherein the image sensor of the first camera module may be configured to convert light incident onto the image sensor through the first to fifth lenses of the first camera module into an electrical signal, the optical axis of the first camera module may be oriented in a first direction, and an optical axis of the second camera module and an optical axis of the third camera module may be oriented in a second direction different from the first direction.

The first camera module may have a first angle of view and a first focal length, the second camera module may have a second angle of view wider than the first angle of view and a second focal length shorter than the first focal length, and the third camera module may have a third angle of view wider than the second angle of view and a third focal length shorter than the second focal length.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
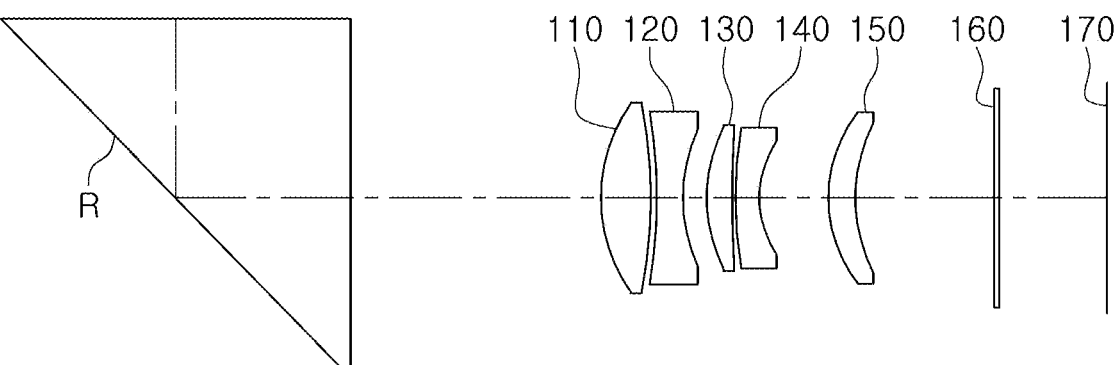
FIG. 1 is a configuration diagram of a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the term "may" with respect to an example or embodiment, e.g., as to what an example or embodiment may include or implement, indicates that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various elements, these elements are not to be limited by these terms. Rather, these terms are only used to distinguish one element from another element. Thus, a first element referred to in examples described herein may also be referred to as a second element without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

In the configuration diagrams of an optical imaging system, the thicknesses, sizes, and shapes of the lenses may be somewhat exaggerated for clarity or ease of illustration. In detail, the shapes of the spherical or aspherical surfaces of the lenses in the configuration diagrams are merely examples, and are not limited to these shapes.

An optical imaging system may include a plurality of lenses disposed along an optical axis. The plurality of lenses may be spaced apart from each other by predetermined distances along the optical axis.

As an example, the optical imaging system includes five lenses.

A first lens is a lens closest to an object side of the optical imaging system, and a fifth lens is a lens closest to an imaging plane of the optical imaging system.

In each lens, a first surface or an object-side surface is a surface closest to the object side of the optical imaging system, and a second surface or an image-side surface is a surface closest to the imaging plane of the optical imaging system.

Radiuses of curvature, thickness of lenses and other elements, distances between the lenses and the other elements, focal lengths, L1S1es, L1S1el, L1S2es, L1S2el, L2S1es, L2S1el, L2S2es, L2S2el, s1es, s1el, DpL1, D12, PTTL, TTL, BFL, and IMG HT are expressed in millimeters (mm), AL1 is expressed in $mm^2$, $\alpha$ and FOV are expressed in degrees, and Fno, refractive indexes, and Abbe numbers are dimensionless quantities. The named quantities are defined later in this application.

The thicknesses of the lenses and other elements, the distances between the lenses and the other elements, DpL1, D12, PTTL, TTL, and BFL are measured along the optical axis of the optical imaging system.

Unless stated otherwise, a reference to the shape of a lens surface means the shape of a paraxial region of the lens surface. A paraxial region of a lens surface is a central portion of the lens surface surrounding the optical axis of the lens surface in which light rays incident to the lens surface make a small angle $\theta$ to the optical axis, and the approximations sin $\theta \approx \theta$, tan $\theta \approx \theta$, and cos $\theta \approx 1$ are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

An optical imaging system includes five lenses.

For example, the optical imaging system includes a first lens, a second lens, a third lens, a fourth lens, and a fifth lens sequentially disposed in ascending numerical order along the optical axis, with the first lens being closest to an object side of the optical imaging system and the fifth lens being closest to an imaging plane of the optical imaging system.

However, the optical imaging system is not limited to only five lenses, and may also further include other elements.

For example, the optical imaging system may further include a reflective member having a reflective surface that changes an optical path in the optical imaging system. For example, the reflective member may be a prism or a mirror.

The reflective member is disposed closer to the object side of the optical imaging system than the plurality of lenses. For example, the reflective member may be disposed closer to the object side of the optical imaging system than the first lens. Therefore, a lens disposed closest to the object side of the optical imaging system may be a lens disposed closest to the reflective member.

The optical imaging system may further include an image sensor for converting an image of an object formed on an imaging plane of the image sensor into an electrical signal.

The optical imaging system may further include an infrared blocking filter (hereinafter, referred to as a filter) for blocking infrared light. The filter is disposed between the lens (the fifth lens) disposed closest to the imaging plane of the image sensor and the image sensor.

All lenses constituting the optical imaging system may be made of a plastic material.

Figures 19, 20:
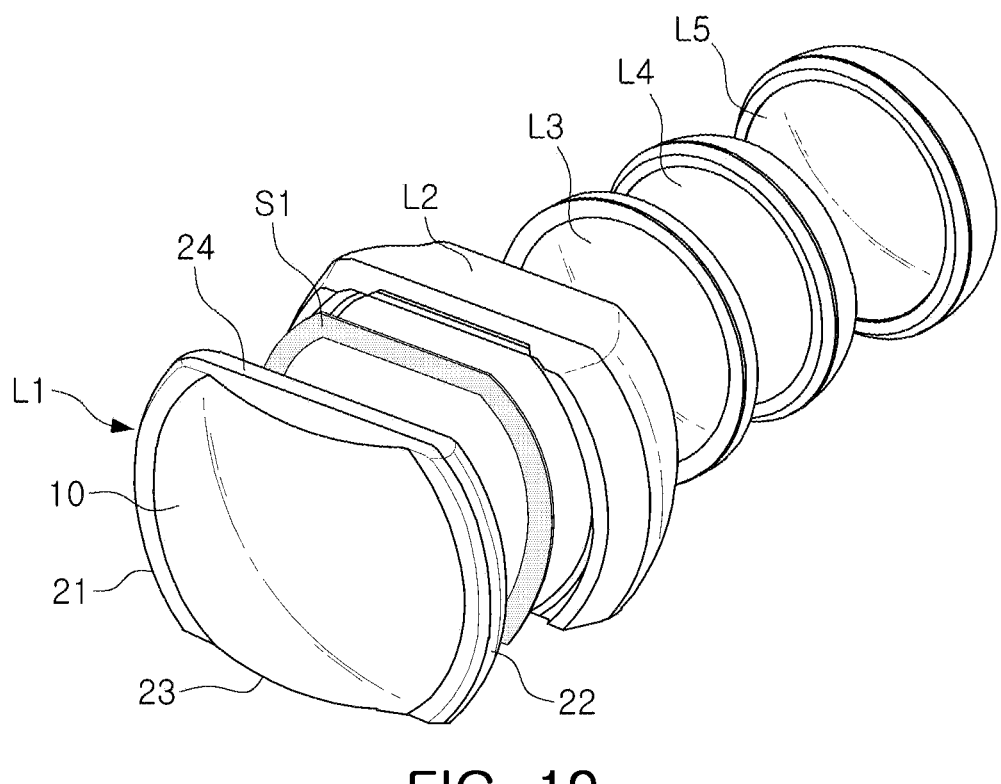
FIG. 19 is a schematic perspective view of an example of an optical imaging system.
FIGS. 20 and 21 are plan views of an example of a first lens of an optical imaging system.
Figure 21:
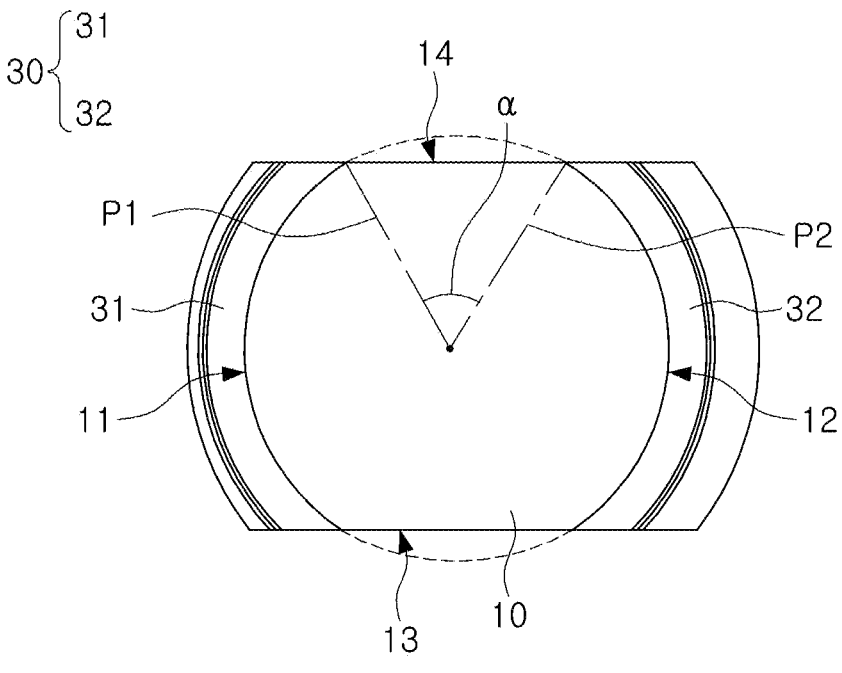

FIG. 19 is a schematic perspective view of an example of an optical imaging system, and FIGS. 20 and 21 are plan views of an example of a first lens of an optical imaging system.

Referring to FIG. 19, at least one of the lenses of the optical imaging system has a non-circular shape when viewed in a direction of an optical axis. For example, either or both of a first lens L1 and a second lens L2 may have a non-circular shape when viewed in the optical axis direction, and remaining lenses, i.e., a third lens L3, a fourth lens L4, and a fifth lens L5 may have a circular shape when viewed in the optical axis direction. Alternatively, all of the first to fifth lenses L1 to L5 of the optical imaging system may have a non-circular shape when viewed in the optical axis direction.

For a plastic injection-molded lens, a non-circular shape may mean that the lens has a non-circular shape when viewed in the optical axis direction in a region of the lens other than a gate of the plastic injection-molded lens.

A lens having non-circular shape has four sides. Two of the sides face each other, and the other two sides face each other. In addition, the sides facing each other have the same shape or shapes that are mirror images of each other.

For example, when viewed in the optical axis direction, a first side 21 and a second side 22 of the first lens L1 are arc-shaped, and a third side 23 and a fourth side 24 of the first lens L1 are substantially straight-shaped. A gate, which is a passage through which a resin material is injected into a mold to form the first lens L1 in an injection-molding operation, may be formed in the first side 21 or the second side 22.

The third side 23 and the fourth side 24 connect the first side 21 and the second side 22 to each other. In addition, the third side 23 and the fourth side 24 are symmetrical about the optical axis and are parallel to each other.

A circular shape includes a shape in which a gate of a plastic injection-molded lens has been removed (e.g., a shape in which a portion of a circular shape has been cut to remove the gate).

All of the first to fifth lenses L1 to L5 of the optical imaging system include an optical portion 10 and a flange portion 30. A lens having a non-circular shape will be described in detail below with reference to FIGS. 19 to 21.

The first lens L1 and the second lens L2 may have a non-circular shape, but this is just an example, and all of the first to fifth lenses L1 to L5 of the optical imaging system may have a non-circular shape.

Hereinafter, for convenience of description, only the first lens L1 will be described.

The optical portion 10 is a portion of the first lens L1 exhibiting a lens characteristic of the first lens L1. For example, light reflected from a subject may be refracted while passing through the optical portion 10.

The optical portion 10 may have a refractive power and an aspherical shape.

The optical portion 10 has an object-side surface (a surface facing the object side of the optical imaging system) and an image-side surface (a surface facing the imaging plane of the optical imaging surface). FIG. 20 illustrates the object-side surface.

The flange portion 30 may be used to attach the first lens L1 to another element, for example, to a lens barrel, or the second lens L2, or a spacer S1 disposed between the first lens L1 and the second lens L2.

The flange portion 30 extends around at least a portion of the optical portion 10, and may be integrally formed with the optical portion 10.

The optical portion 10 and the flange portion 30 have a non-circular shape when viewed in the optical axis direction. Alternatively, the optical portion 10 may have a circular shape when viewed in the optical axis direction, and the flange portion 30 may have a non-circular shape when viewed in the optical axis direction.

The optical portion 10 includes a first edge 11, a second edge 12, a third edge 13, and a fourth edge 14. The first edge 11 and the second edge 12 face each other, and the third edge 13 and the fourth edge 14 face each other.

The third edge 13 and the fourth edge 14 connect the first edge 11 and the second edge 12 to each other.

When viewed in the optical axis direction, the first edge 11 and the second edge 12 are arc-shaped, and the third edge 13 and the fourth edge 14 are substantially straight-shaped. The third edge 13 and the fourth edge 14 are symmetrical about the optical axis, and may be parallel to each other.

The optical portion 10 has a major axis (a) and a minor axis (b). For example, when viewed in the optical axis direction, a shortest line segment connecting the third edge 13 to the fourth edge 14 while passing through the optical axis is the minor axis (b), and a line segment connecting the first edge 11 to the second edge 12 while passing through the optical axis and being perpendicular to the minor axis (b) is the major axis (a).

One-half of the major axis (a) is a maximum effective radius, and one-half of the minor axis (b) is a minimum effective radius.

The flange portion 30 includes a first flange portion 31 and a second flange portion 32. The first flange portion 31 extends from the first edge 11 of the optical portion 10 away from the optical axis, and the second flange portion 32 extends from the second edge 12 of the optical portion 10 away from the optical axis.

The first edge 11 of the optical portion 10 is adjacent to the first flange portion 31, and the second edge 12 of the optical portion 10 is adjacent to the second flange portion 32.

The third edge 13 of the optical portion 10 is one side of the optical portion 10 on which the flange portion 30 is not formed, and the fourth edge 14 of the optical portion 10 another side of the optical portion 10 on which the flange portion 30 is not formed.

The first lens L1 is made of a plastic material and is formed in an injection molding process by injecting a plastic resin into a mold. The third edge 13 and the fourth edge 14 of the first lens L1 are not formed by cutting off portions of the first lens L1 after the first lens L1 is formed in the injection molding process, but are formed when the first lens L1 is formed during the injection molding process.

If a portion of a lens is cut off after the lens is formed in an injection molding process, the lens may be deformed by the cutting force applied to the lens, causing an optical performance of the lens to change.

However, since the first lens L1 is formed to have a non-circular shape during the injection molding process, the optical performance of the first lens L1 is ensured while the size of the first lens L1 is reduced.

In this example, the effective radius of a non-circular lens may be greater than effective radiuses of other lenses.

The effective radius of a lens surface is a radius of a portion of the lens surface (an object-side surface or an image-side surface) through which light actually passes. For example, the effective radius may be a radius of the optical portion of each lens.

Since the first lens L1 has a non-circular shape when viewed in the optical axis direction, the first lens L1 has a maximum effective radius (one-half of a straight line connecting the first edge 11 to the second edge 12 while passing through the optical axis) and a minimum effective radius (one-half of a straight line connecting the third edge 13 to the fourth edge 14 while passing through the optical axis) as the effective radius.

Referring to FIG. 21, a first virtual line connecting a connection point between the first edge 11 and the fourth edge 14 (or the third edge 13) of the non-circular lens surface to the optical axis is defined as P1, a second virtual line connecting a connection point between the second edge 12 and the fourth edge 14 (or the third edge 13) of the non-circular lens to the optical axis is defined as P2, and an angle between the first and second virtual lines P1 and P2 is defined as α.

Each of the plurality of lenses may have at least one aspherical surface.

For example, either one or both of the first and second surfaces of the first to fifth lenses may be aspherical. In this case, the aspherical surfaces of the first to fifth lenses are expressed by Equation 1 below.

$$Z = \frac{cY^2}{1 + \sqrt{1 - (1+K)c^2Y^2}} + AY^4 + \tag{1}$$
$$BY^6 + CY^8 + DY^{10} + EY^{12} + fY^{14} + GY^{16} + HY^{18}$$

In Equation 1, c is a curvature of a lens surface and is equal to a reciprocal of a radius of curvature of the lens surface at an optical axis of the lens surface, K is a conic constant, Y is a distance from any point on the lens surface to the optical axis of the lens surface in a direction perpendicular to the optical axis of the lens surface, A to H are aspheric constants, and Z (also known as sag) is a distance in a direction parallel to the optical axis of the lens surface from the point on the lens surface at the distance Y from the optical axis of the lens surface to a tangential plane perpendicular to the optical axis and intersecting a vertex of the lens surface.

The optical imaging system may satisfy any one or any combination of any two or more of Conditional Expressions 1 to 26 below.

$$0.7 \leq L1S1es/L1S1el < 1.0 \qquad \text{(Conditional Expression 1)}$$

$$0.7 \leq L1S2es/L1S2el < 1.0 \qquad \text{(Conditional Expression 2)}$$

$$0.7 \leq L2S1es/L2S1el < 1.0 \qquad \text{(Conditional Expression 3)}$$

$$0.7 \leq L2S2es/L2S2el < 1.0 \qquad \text{(Conditional Expression 4)}$$

$$2.0 \text{ mm21 DpL1} < 10.0 \text{ mm} \qquad \text{(Conditional Expression 5)}$$

$$24.0 \text{ mm} < \text{PTTL} < 34.0 \text{ mm} \qquad \text{(Conditional Expression 6)}$$

$$0.7 \leq s1es/s1el < 1.0 \qquad \text{(Conditional Expression 7)}$$

$$0.55 < L1S1el/IMG \ HT < 1.3 \qquad \text{(Conditional Expression 8)}$$

$$0 < L1S1el/PTTL < 0.14 \qquad \text{(Conditional Expression 9)}$$

$$0 < L1S1es/PTTL < 0.1 \qquad \text{(Conditional Expression 10)}$$

$0 < L2S1el/PTTL < 0.14$ (Conditional Expression 11)

$0 < L2S1es/PTTL < 0.1$ (Conditional Expression 12)

$0 < AL1/(PTTL)^2 < 0.05$ (Conditional Expression 13)

$0° < \alpha < 92°$ (Conditional Expression 14)

$1.5 < \alpha/(2*FOV) < 3.0$ (Conditional Expression 15)

$0.8 < BFL/(2*IMG\ HT) < 2.5$ (Conditional Expression 16)

$2.8 \leq Fno < 5$ (Conditional Expression 17)

$3.2 \leq n2 + n3$ (Conditional Expression 18)

$|f1 + f2| < 2.0\ mm$ (Conditional Expression 19)

$0 \leq D12/f \leq 0.07$ (Conditional Expression 20)

$0.8 \leq L1S2el/L1S1el \leq 1.0$ (Conditional Expression 21)

$0.8 \leq TTL/f \leq 1.25$ (Conditional Expression 22)

$3.5 \leq TTL/IMG\ HT$ (Conditional Expression 23)

$0.2 \leq R1/f \leq 0.6$ (Conditional Expression 24)

$FOV < 30°$ (Conditional Expression 25)

In the above Conditional Expressions 1 to 25, L1S1el is a maximum effective radius of the object-side surface of the first lens, L1S1es is a minimum effective radius of the object-side surface of the first lens, L1S2el is a maximum effective radius of the image-side surface of the first lens, and L1S2es is a minimum effective radius of the image-side surface of the first lens.

L2S1el is a maximum effective radius of the object-side surface of the second lens, L2S1es is a minimum effective radius of the object-side surface of the second lens, L2S2el is a maximum effective radius of the image-side surface of the second lens, and L2S2es is a minimum effective radius of the image-side surface of the second lens.

DpL1 is a distance along the optical axis between a light exit surface of the prism and the object-side surface of the first lens, TTL is a distance along the optical axis from the object-side surface of the first lens to an imaging plane of the image sensor, and PTTL is a distance along the optical axis from the reflective surface of the prism to the imaging plane of the image sensor.

s1el is a maximum radius of an opening of a spacer disposed between the first lens and the second lens, and s1es is a minimum radius of the opening of the spacer disposed between the first lens and the second lens.

IMG HT is one-half of a diagonal length of the imaging plane of the image sensor.

AL1 is an area of the optical portion 30 of the object-side surface of the first lens L1 when the first lens L1 is viewed in the optical axis direction as shown in FIG. 20.

α is an angle between a first virtual line P1 connecting a connection point between the first side 11 and the fourth side 14 of the optical portion 10 of the first lens L1 to the optical axis, and a second virtual line P2 connecting a connection point between the second side 12 and the fourth side 14 of the optical portion 10 of the first lens L1 to the optical axis as shown in FIG. 21.

FOV is an angle of view of the optical imaging system, f is a total focal length of the optical imaging system, and BFL is a distance along the optical axis from the image-side surface of the fifth lens to the imaging plane of the image sensor.

Fno is an f-number of the optical imaging system, and is equal to the total focal length f of the optical imaging system divided by an entrance pupil diameter of the optical imaging system.

n2 is a refractive index of the second lens, and n3 is a refractive index of the third lens.

f1 is a focal length of the first lens, and f2 is a focal length of the second lens.

D12 is a distance along the optical axis from the image-side surface of the first lens to the object-side surface of the second lens.

R1 is a radius of curvature of the object-side surface of the first lens.

Next, first to fifth lenses in examples of the optical imaging system will be described.

The first lens has a positive refractive power. In addition, both sides of the first lens may be convex. In detail, the first surface and the second surface of the first lens may be convex.

In the first lens, either one or both of the first surface and the second surface may be aspherical. For example, both surfaces of the first lens may be aspherical.

The second lens has a negative refractive power. In addition, the second lens may have a meniscus shape convex toward the object. In detail, the first surface of the second lens may be convex, and the second surface of the second lens may be concave.

Alternatively, both surfaces of the second lens may be concave. In detail, the first and second surfaces of the second lens may be concave.

Alternatively, the second lens may have a meniscus shape convex toward the imaging plane. In detail, the first surface of the second lens may be concave, and the second surface of the second lens may be convex.

In the second lens, either one or both of the first surface and the second surface may be aspherical. For example, both surfaces of the second lens may be aspherical.

The third lens may have a positive refractive power or a negative refractive power. In addition, the third lens may have a meniscus shape convex toward the object. In detail, the first surface of the third lens may be convex, and the second surface of the third lens may be concave.

In the third lens, either one or both of the first surface and the second surface may be aspherical. For example, both surfaces of the third lens may be aspherical.

The fourth lens has a positive refractive power or a negative refractive power. In addition, the fourth lens may have a meniscus shape convex toward the object. In detail, the first surface of the fourth lens may be convex, and the second surface of the fourth lens may be concave.

Alternatively, both surfaces of the fourth lens may be concave. In detail, the first and second surfaces of the fourth lens may be concave.

Alternatively, the fourth lens may have a meniscus shape convex toward the imaging plane. In detail, the first surface of the fourth lens may be concave, and the second surface of the fourth lens may be convex.

In the fourth lens, either one or both of the first surface and the second surface may be aspherical. For example, both surfaces of the fourth lens may be aspherical.

The fifth lens has a positive refractive power or a negative refractive power. In addition, the fifth lens may have a meniscus shape convex toward the object. In detail, the first In addition, the optical imaging system 100 further includes a reflective member R disposed closer to the object side than the first lens 110 and having a reflective surface changing an optical path. The reflective member R may be a prism or a mirror.

Optical characteristics of each element (a radius of curvature, a thickness of an element or a distance between the element and a next element, a refractive index, an Abbe number, an effective radius, and a focal length) of the optical imaging system 100 are illustrated in Table 1 below. The effective radius of a lens having a non-circular shape is a maximum effective radius of the lens having the non-circular shape. A minimum effective radius of the lens having the non-circular shape may be smaller than the maximum effective radius, and may be equal to or greater than 70% of the maximum effective radius.

TABLE 1

| Surface Number | Element | Radius of Curvature | Thickness or Distance | Refractive Index | Abbe Number | Effective Radius | Focal Length |
|---|---|---|---|---|---|---|---|
| S1 | Prism | Infinity | 6.300 | 1.723 | 29.5 | 6.000 | |
| S2 | | Infinity | 6.300 | 1.723 | 29.5 | 8.485 | |
| S3 | | Infinity | 9.000 | | | 6.000 | |
| S4 | First Lens | 5.23 | 1.875 | 1.537 | 55.7 | 3.000 | 6.963 |
| S5 | | −11.46 | 0.150 | | | 2.863 | |
| S6 | Second Lens | −22.38 | 0.947 | 1.621 | 26.0 | 2.742 | −6.207684 |
| S7 | | 4.73 | 0.875 | | | 2.389 | |
| S8 | Third Lens | 5.36 | 0.948 | 1.679 | 19.2 | 2.321 | 10.343 |
| S9 | | 21.00 | 0.100 | | | 2.276 | |
| S10 | Fourth Lens | 8.92 | 0.861 | 1.621 | 26.0 | 2.253 | −9.940221 |
| S11 | | 3.51 | 2.494 | | | 2.116 | |
| S12 | Fifth Lens | 4.45 | 1.000 | 1.547 | 56.1 | 2.754 | 26.868607 |
| S13 | | 5.87 | 5.169 | | | 2.674 | |
| S14 | Filter | Infinity | 0.210 | 1.519 | 64.2 | 3.491 | |
| S15 | | Infinity | 3.818 | | | 3.515 | |
| S16 | Imaging Plane | Infinity | | | | 4.203 | | surface of the fifth lens may be convex, and the second surface thereof may be concave.

Alternatively, both surfaces of the fifth lens may be convex. In detail, the first surface and the second surface of the fifth lens may be convex.

Alternatively, the fifth lens may have a meniscus shape convex toward the imaging plane. In detail, the first surface of the fifth lens may be concave, and the second surface may be convex.

In the fifth lens, either one or both of the first surface and the second surface may be aspherical. For example, both surfaces of the fifth lens may be aspherical.

The optical imaging system is a telephoto optical imaging system having a relatively narrow angle of view and a relatively long focal length.

FIG. 1 is a configuration diagram of a first example of an optical imaging system.

Referring to FIG. 1, an optical imaging system 100 includes an optical system including a first lens 110, a second lens 120, a third lens 130, a fourth lens 140, and a fifth lens 150, and further includes a filter 160 and an image sensor 170. The filter 160 may be an infrared blocking filter for blocking infrared light.

The total focal length f of the optical imaging system 100 is 19.0095 mm, Fno is 3.16, IMG HT is 4.203 mm, FOV is 23.4°, $\alpha$ is 91.146°, AL1 is 22.955 mm$^2$, BFL is 9.197 mm, TTL is 18.447 mm, and PTTL is 33.747 mm.

The first lens 110 has a positive refractive power, and the first and second surfaces of the first lens 110 are convex.

The second lens 120 has a negative refractive power, and the first and second surfaces of the second lens 120 are concave.

The third lens 130 has a positive refractive power, the first surface of the third lens 130 is convex, and the second surface of the third lens 130 is concave.

The fourth lens 140 has a negative refractive power, the first surface of the fourth lens 140 is convex, and the second surface thereof is concave.

The fifth lens 150 has a positive refractive power, the first surface of the fifth lens 150 is convex, and the second surface of the fifth lens 150 is concave.

Each surface of the first lens 110 to the fifth lens 150 has the aspherical surface coefficients illustrated in Table 2 below. Both the object-side surface and the image-side surface of the first lens 110 to the fifth lens 150 are aspherical surfaces.

TABLE 2

|   | S4 | S5 | S6 | S7 | S8 | S9 | S10 | S11 | S12 | S13 |
|---|---|---|---|---|---|---|---|---|---|---|
| K | −0.67026 | 0.00000 | 0.00000 | 0.00000 | 0.00000 | 0.00000 | 0.00000 | 0.00000 | 0.00000 | 0.00000 |
| A | 0.00027 | 0.00073 | −0.00157 | −0.00364 | −0.00294 | −0.00287 | −0.00301 | −0.00545 | −0.00328 | −0.00153 |
| B | 0.00001 | 0.00000 | 0.00011 | 0.00005 | 0.00020 | 0.00030 | −0.00003 | 0.00013 | 0.00006 | −0.00002 |
| C | 0.00000 | 0.00000 | 0.00000 | −0.00001 | −0.00001 | −0.00002 | 0.00003 | 0.00005 | 0.00001 | 0.00002 |
| D | 0.00000 | 0.00000 | 0.00000 | 0.00000 | 0.00000 | 0.00000 | −0.00001 | −0.00001 | 0.00000 | 0.00000 |
| E | 0.00000 | 0.00000 | 0.00000 | 0.00000 | 0.00000 | 0.00000 | 0.00000 | 0.00000 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |

Figure 2:
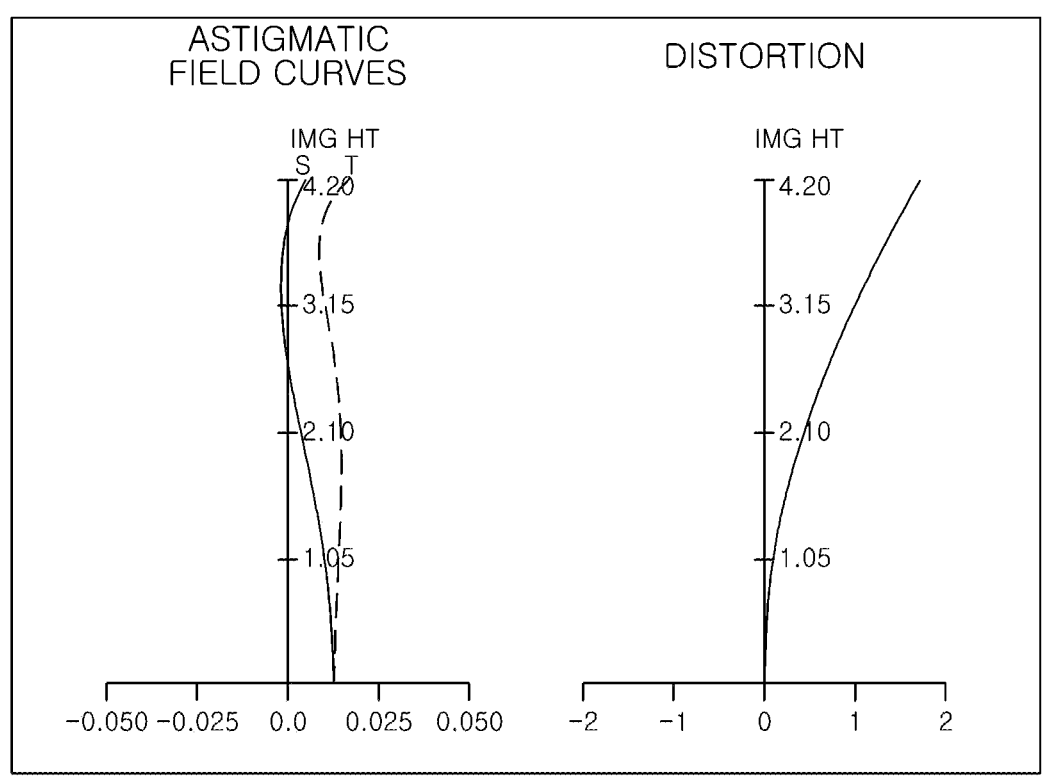
FIG. 2 shows graphs illustrating aberration characteristics of the optical imaging system illustrated in FIG. 1.

FIG. 2 shows graphs illustrating aberration characteristics of the optical imaging system 100 illustrated in FIG. 1.

Figure 3:
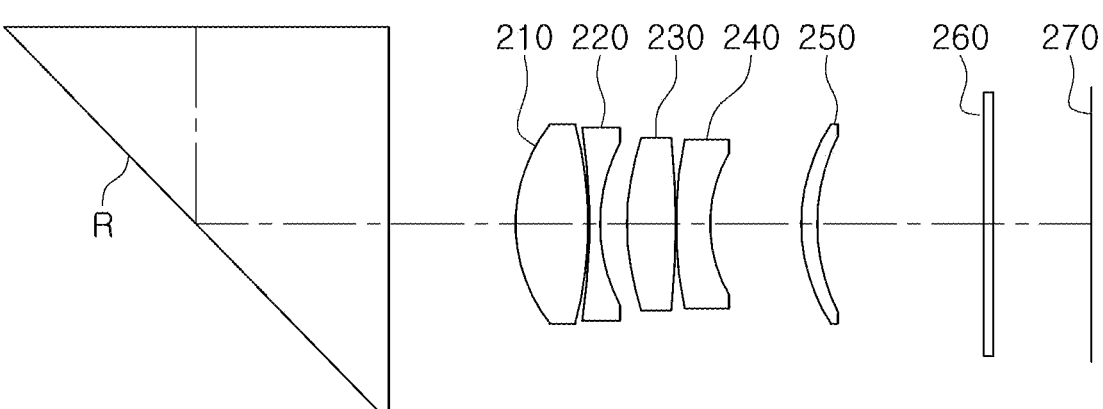
FIG. 3 is a configuration diagram of a second example of an optical imaging system.

FIG. 3 is a configuration diagram of a second example of an optical imaging system.

Referring to FIG. 3, an optical imaging system 200 includes an optical system including a first lens 210, a second lens 220, a third lens 230, a fourth lens 240, and a fifth lens 250, and further includes a filter 260 and an image sensor 270. The filter 260 may be an infrared blocking filter for blocking infrared light.

In addition, the optical imaging system 200 further includes a reflective member R disposed closer to the object side than the first lens 210 and having a reflective surface changing an optical path. The reflective member R may be a prism or a mirror.

Optical characteristics of each element (a radius of curvature, a thickness of an element or a distance between the element and a next element, a refractive index, an Abbe number, an effective radius, and a focal length) of the optical imaging system 200 are illustrated in Table 3 below. The effective radius of a lens having a non-circular shape is a maximum effective radius of the lens having the non-circular shape. A minimum effective radius of the lens having the non-circular shape is smaller than the maximum effective radius, and may be equal to or greater than 70% of the maximum effective radius.

The total focal length f of the optical imaging system 200 is 19.1931 mm, Fno is 3.16, IMG HT is 4.200 mm, FOV is 23.2°, α is 91.146°, and AL1 is 15.941 mm², BFL is 8.807 mm, TTL is 18.290 mm, and PTTL is 24.640 mm.

The first lens 210 has a positive refractive power, and the first and second surfaces of the first lens 210 are convex.

The second lens 220 has a negative refractive power, and the first and second surfaces of the second lens 220 are concave.

The third lens 230 has a positive refractive power, the first surface of the third lens 230 is convex, and the second surface of the third lens 230 is concave.

The fourth lens 240 has a negative refractive power, the first surface of the fourth lens 240 is convex, and the second surface of the fourth lens 240 is concave.

The fifth lens 250 has a positive refractive power, the first surface of the fifth lens 250 is convex, and the second surface of the fifth lens 250 is concave.

Each surface of the first lens 210 to the fifth lens 250 has the aspherical surface coefficients illustrated in Table 4 below. Both the object-side surface and the image-side surface of the first lens 210 to the fifth lens 250 are aspherical surfaces.

TABLE 3

| Surface Number | Element | Radius of Curvature | Thickness or Distance | Refractive Index | Abbe Number | Effective Radius | Focal Length |
|---|---|---|---|---|---|---|---|
| S1 | Prism | Infinity | 6.000 | 1.723 | 29.5 | 5.500 | |
| S2 | | Infinity | 4.000 | 1.723 | 29.5 | 8.000 | |
| S3 | | Infinity | 2.350 | | | 5.500 | |
| S4 | First Lens | 4.65 | 2.277 | 1.537 | 55.7 | 2.500 | 6.506 |
| S5 | | −11.59 | 0.129 | | | 2.219 | |
| S6 | Second Lens | −10.71 | 0.300 | 1.621 | 26.0 | 2.178 | −5.26132 |
| S7 | | 4.75 | 0.815 | | | 2.028 | |
| S8 | Third Lens | 8.02 | 1.466 | 1.679 | 19.2 | 2.002 | 13.783 |
| S9 | | 51.79 | 0.063 | | | 2.040 | |
| S10 | Fourth Lens | 5.63 | 1.119 | 1.621 | 26.0 | 2.045 | −37.90458 |
| S11 | | 4.20 | 2.809 | | | 1.989 | |
| S12 | Fifth Lens | 4.62 | 0.506 | 1.547 | 56.1 | 2.754 | 201.7984 |
| S13 | | 4.65 | 5.563 | | | 2.639 | |
| S14 | Filter | Infinity | 0.210 | 1.519 | 64.2 | 3.588 | |
| S15 | | Infinity | 3.034 | | | 3.614 | |
| S16 | Imaging Plane | Infinity | | | | 4.200 | |

TABLE 4

| | S4 | S5 | S6 | S7 | S8 | S9 | S10 | S11 | S12 | S13 |
|---|---|---|---|---|---|---|---|---|---|---|
| K | −0.63551 | 0.00000 | 0.00000 | 0.00000 | 0.00000 | 0.00000 | 0.00000 | 0.00000 | 0.00000 | 0.00000 |
| A | 0.00028 | 0.00200 | 0.00091 | −0.00302 | 0.00006 | −0.00266 | −0.00643 | −0.00319 | −0.00763 | −0.00794 |
| B | 0.00001 | 0.00002 | 0.00010 | 0.00003 | 0.00000 | 0.00003 | −0.00033 | −0.00017 | 0.00033 | 0.00037 |
| C | 0.00000 | −0.00002 | −0.00003 | −0.00001 | −0.00002 | −0.00002 | 0.00005 | 0.00008 | 0.00005 | 0.00003 |
| D | 0.00000 | 0.00000 | 0.00000 | 0.00000 | 0.00000 | 0.00000 | 0.00000 | −0.00001 | 0.00000 | 0.00000 |
| E | 0.00000 | 0.00000 | 0.00000 | 0.00000 | 0.00000 | 0.00000 | 0.00000 | 0.00000 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |

Figure 4:
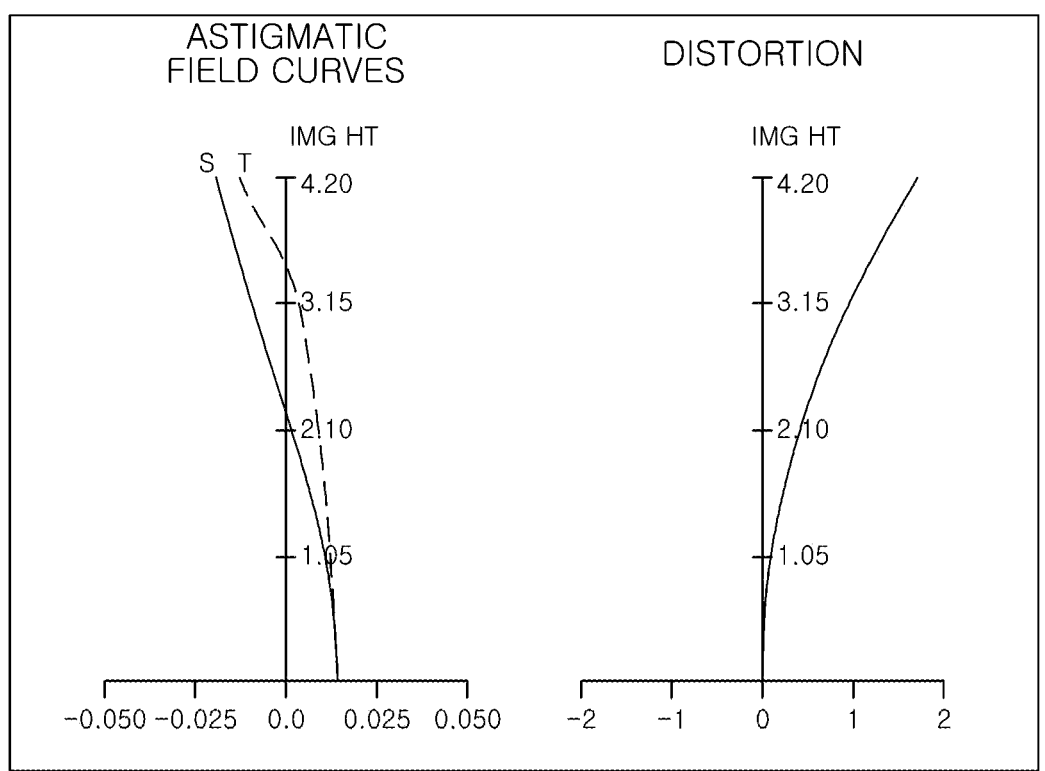
FIG. 4 shows graphs illustrating aberration characteristics of the optical imaging system illustrated in FIG. 3.

FIG. 4 shows graphs illustrating aberration characteristics of the optical imaging system 200 illustrated in FIG. 3.

Figure 5:
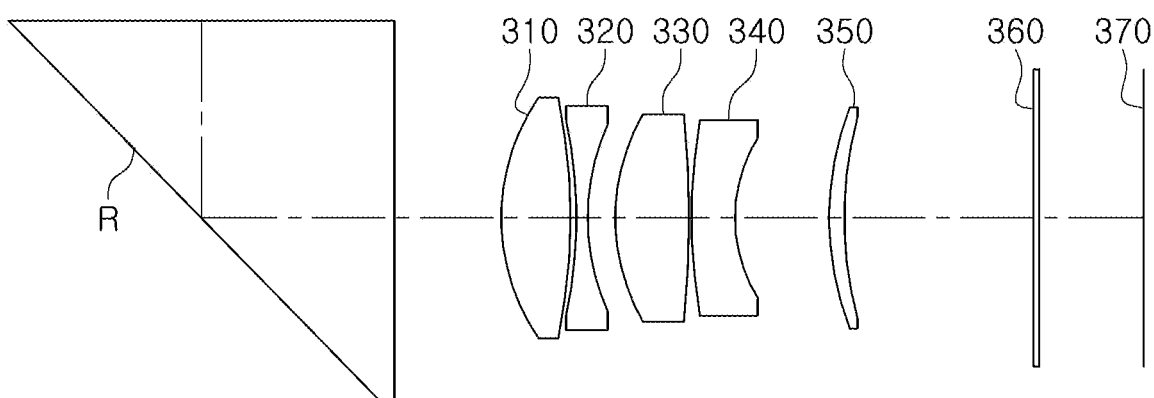
FIG. 5 is a configuration diagram of a third example of an optical imaging system.

FIG. 5 is a configuration diagram of a third example of an optical imaging system.

Referring to FIG. 5, an optical imaging system 300 includes an optical system including a first lens 310, a second lens 320, a third lens 330, a fourth lens 340, and a fifth lens 350, and further includes a filter 360 and an image sensor 370. The filter 360 may be an infrared blocking filter for blocking infrared light.

In addition, the optical imaging system 300 further includes a reflective member R disposed closer to the object side than the first lens 310 and having a reflective surface changing an optical path. The reflective member R may be a prism or a mirror.

Optical characteristics of each element (a radius of curvature, a thickness of the element or a distance between the element and a next element, a refractive index, an Abbe number, an effective radius, and a focal length) of the optical imaging system 300 are illustrated in Table 5 below. The effective radius of a lens having a non-circular shape is a maximum effective radius of the lens having the non-circular shape. A minimum effective radius of the lens having the non-circular shape is smaller than the maximum effective radius, and may be equal to or greater than 70% of the maximum effective radius.

The total focal length f of the optical imaging system 300 is 19.05 mm, Fno is 3.16, IMG HT is 4.212 mm, FOV is 23.4°, α is 91.146°, AL1 is 22.955 mm², BFL is 8.622 mm, TTL is 18.450 mm, PTTL is 26.950 mm.

The first lens 310 has a positive refractive power, and the first and second surfaces of the first lens 310 are convex.

The second lens 320 has a negative refractive power, and the first and second surfaces of the second lens 320 are concave.

The third lens 330 has a positive refractive power, the first surface of the third lens 330 is convex, and the second surface of the third lens 330 is concave.

The fourth lens 340 has a negative refractive power, the first surface of the fourth lens 340 is convex, and the second surface of the fourth lens 340 is concave.

The fifth lens 350 has a positive refractive power, the first surface of the fifth lens 350 is convex, and the second surface of the fifth lens 350 is concave.

Each surface of the first lens 310 to the fifth lens 350 has the aspherical surface coefficients illustrated in Table 6 below. Both the object-side surface and the image-side surface of the first lens 310 to the fifth lens 350 are aspherical surfaces.

TABLE 5

| Surface Number | Element | Radius of Curvature | Thickness or Distance | Refractive Index | Abbe Number | Effective Radius | Focal Length |
|---|---|---|---|---|---|---|---|
| S1 | Prism | Infinity | 5.500 | 1.723 | 29.5 | 5.000 | |
| S2 | | Infinity | 5.500 | 1.723 | 29.5 | 7.000 | |
| S3 | | Infinity | 3.000 | | | 5.000 | |
| S4 | First Lens | 5.07 | 2.042 | 1.537 | 55.7 | 3.000 | 6.889 |
| S5 | | −11.75 | 0.127 | | | 2.824 | |
| S6 | Second Lens | −10.45 | 0.300 | 1.641 | 24.0 | 2.790 | −5.002511 |
| S7 | | 4.68 | 0.807 | | | 2.575 | |
| S8 | Third Lens | 5.29 | 2.144 | 1.679 | 19.2 | 2.586 | 8.166 |
| S9 | | 94.70 | 0.050 | | | 2.505 | |
| S10 | Fourth Lens | 6.38 | 1.221 | 1.679 | 19.2 | 2.421 | −15.81429 |
| S11 | | 3.69 | 2.708 | | | 2.192 | |
| S12 | Fifth Lens | 6.49 | 0.429 | 1.537 | 55.7 | 2.754 | 180.46357 |
| S13 | | 6.79 | 5.563 | | | 2.754 | |
| S14 | Filter | Infinity | 0.210 | 1.519 | 64.2 | 3.677 | |
| S15 | | Infinity | 2.849 | | | 3.701 | |
| S16 | Imaging Plane | Infinity | | | | 4.212 | |

TABLE 6

| | S4 | S5 | S6 | S7 | S8 | S9 | S10 | S11 | S12 | S13 |
|---|---|---|---|---|---|---|---|---|---|---|
| K | −0.73794 | 0.00000 | 0.00000 | 0.00000 | 0.00000 | 0.00000 | 0.00000 | 0.00000 | 0.00000 | 0.00000 |
| A | 0.00009 | 0.00199 | 0.00112 | −0.00283 | 0.00022 | −0.00278 | −0.00684 | −0.00349 | −0.00777 | −0.00805 |
| B | 0.00001 | 0.00003 | 0.00010 | 0.00004 | 0.00000 | −0.00002 | −0.00033 | −0.00013 | 0.00037 | 0.00037 |
| C | 0.00000 | −0.00002 | −0.00003 | −0.00001 | −0.00002 | −0.00002 | 0.00005 | 0.00009 | 0.00005 | 0.00003 |
| D | 0.00000 | 0.00000 | 0.00000 | 0.00000 | 0.00000 | 0.00000 | 0.00000 | −0.00001 | 0.00000 | 0.00000 |
| E | 0.00000 | 0.00000 | 0.00000 | 0.00000 | 0.00000 | 0.00000 | 0.00000 | 0.00000 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |

Figure 6:
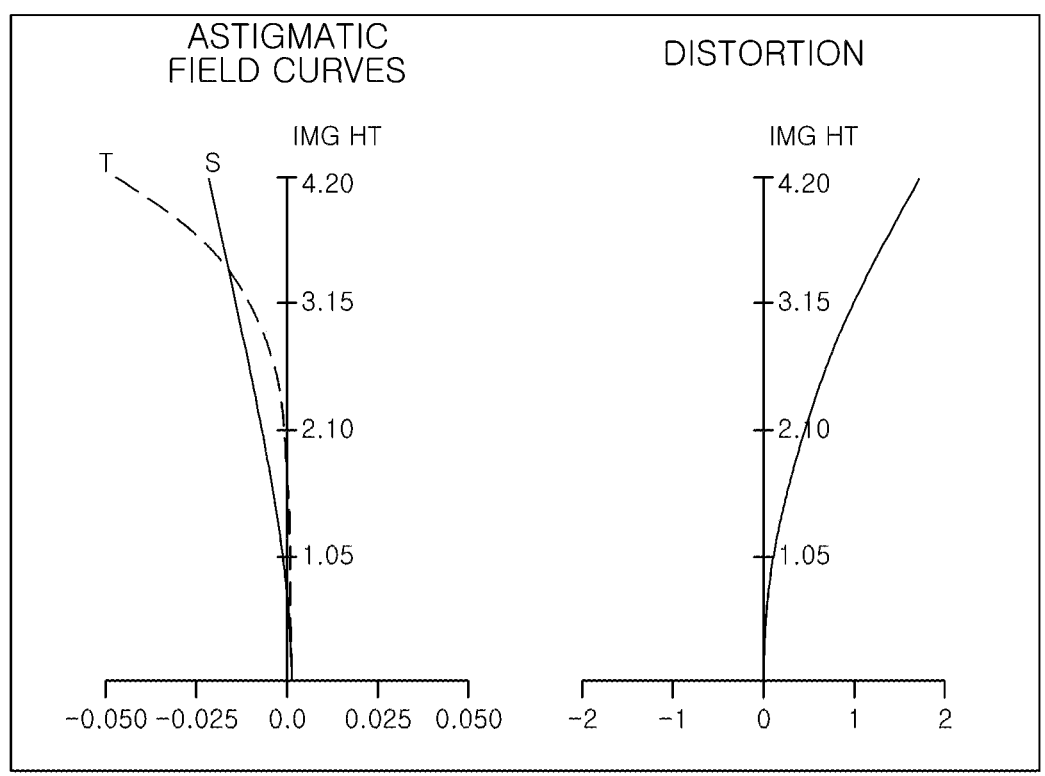
FIG. 6 shows graphs illustrating aberration characteristics of the optical imaging system illustrated in FIG. 5.

FIG. 6 shows graphs illustrating aberration characteristics of the optical imaging system 300 illustrated in FIG. 5.

Figure 7:
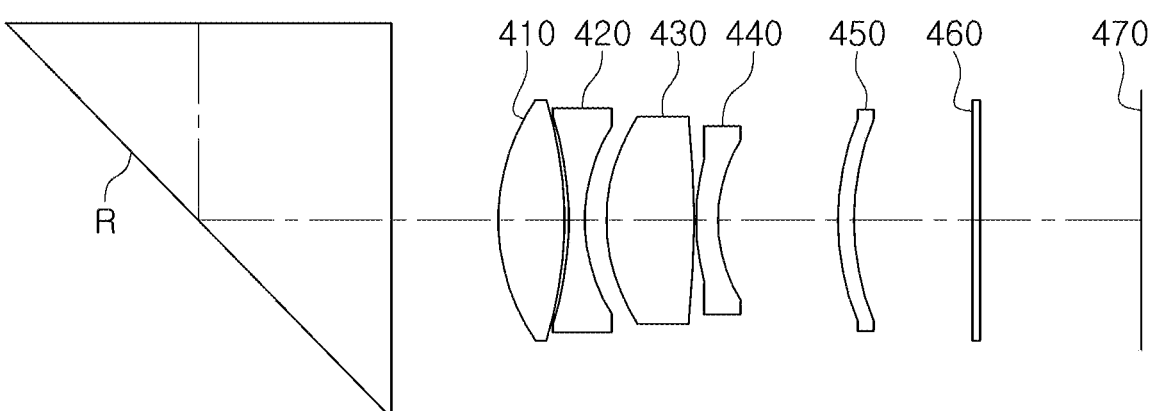
FIG. 7 is a configuration diagram of a fourth example of an optical imaging system.

FIG. 7 is a configuration diagram of a fourth example of an optical imaging system.

Referring to FIG. 7, an optical imaging system 400 includes an optical system including a first lens 410, a second lens 420, a third lens 430, a fourth lens 440, and a fifth lens 450, and further includes a filter 460 and an image sensor 470. The filter 460 may be an infrared blocking filter for blocking infrared light.

In addition, the optical imaging system 400 further includes a reflecting member R disposed closer to the object side than the first lens 410 and having a reflective surface changing an optical path. The reflective member R may be a prism or a mirror.

Optical characteristics of each element (a radius of curvature, a thickness of the element or a distance between the element and a next element, a refractive index, an Abbe number, an effective radius, and a focal length) of the optical imaging system 400 are illustrated in Table 7 below. The effective radius of a lens having a non-circular shape is a maximum effective radius of the lens having the non-circular shape. A minimum effective radius of the lens having the non-circular shape is smaller than the maximum effective radius, and may be equal to or greater than 70% of the maximum effective radius.

The total focal length f of the optical imaging system 400 is 19.05 mm, Fno is 3.16, IMG HT is 5.017 mm, FOV is 28.8°, α is 91.146°, and AL1 is 22.955 mm², BFL is 8.310 mm, TTL is 18.450 mm, PTTL is 26.950 mm.

The first lens 410 has a positive refractive power, and the first and second surfaces of the first lens 410 are convex.

The second lens 420 has a negative refractive power, and the first and second surfaces of the second lens 420 are concave.

The third lens 430 has a positive refractive power, the first surface of the third lens 430 is convex, and the second surface of the third lens 230 is concave.

The fourth lens 440 has a negative refractive power, the first surface of the fourth lens 440 is convex, and the second surface of the fourth lens 440 is concave.

The fifth lens 450 has a negative refractive power, the first surface of the fifth lens 450 is convex, and the second surface of the fifth lens 450 is concave.

Each surface of the first lens 410 to the fifth lens 450 has the aspherical surface coefficients illustrated in Table 8 below. Both the object-side surface and the image-side surface of the first lens 410 to the fifth lens 450 are aspherical surfaces.

TABLE 7

| Surface Number | Element | Radius of Curvature | Thickness or Distance | Refractive Index | Abbe Number | Effective Radius | Focal Length |
|---|---|---|---|---|---|---|---|
| S1 | Prism | Infinity | 5.500 | 1.723 | 29.5 | 5.000 | |
| S2 | | Infinity | 5.500 | 1.723 | 29.5 | 7.000 | |
| S3 | | Infinity | 3.000 | | | 5.000 | |
| S4 | First Lens | 5.21 | 1.938 | 1.537 | 55.7 | 3.000 | 6.380 |
| S5 | | −8.68 | 0.117 | | | 2.876 | |
| S6 | Second Lens | −7.82 | 0.447 | 1.621 | 26.0 | 2.834 | −4.571487 |
| S7 | | 4.55 | 0.634 | | | 2.574 | |
| S8 | Third Lens | 4.84 | 2.487 | 1.679 | 19.2 | 2.595 | 7.865 |
| S9 | | 48.92 | 0.073 | | | 2.450 | |
| S10 | Fourth Lens | 5.53 | 0.602 | 1.679 | 19.2 | 2.344 | −18.53243 |
| S11 | | 3.67 | 3.393 | | | 2.208 | |
| S12 | Fifth Lens | 4.51 | 0.450 | 1.668 | 20.4 | 2.754 | −1335.159 |
| S13 | | 4.31 | 3.643 | | | 2.765 | |
| S14 | Filter | Infinity | 0.210 | 1.519 | 64.2 | 3.647 | |
| S15 | | Infinity | 4.456 | | | 3.687 | |
| S16 | Imaging Plane | Infinity | | | | 5.017 | |

TABLE 8

|   | S4 | S5 | S6 | S7 | S8 | S9 | S10 | S11 | S12 | S13 |
|---|---|---|---|---|---|---|---|---|---|---|
| K | −0.69653 | 0.00000 | 0.00000 | 0.00000 | 0.00000 | 0.00000 | 0.00000 | 0.00000 | 0.00000 | 0.00000 |
| A | 0.00015 | 0.00208 | 0.00180 | −0.00200 | 0.00009 | −0.00288 | −0.00814 | −0.00454 | −0.00783 | −0.00885 |
| B | −0.00001 | 0.00003 | 0.00011 | 0.00000 | −0.00007 | −0.00015 | −0.00043 | −0.00017 | 0.00032 | 0.00039 |
| C | 0.00000 | −0.00002 | −0.00003 | −0.00001 | −0.00001 | −0.00001 | 0.00004 | 0.00005 | 0.00001 | 0.00000 |
| D | 0.00000 | 0.00000 | 0.00000 | 0.00000 | 0.00000 | 0.00000 | 0.00000 | −0.00001 | 0.00000 | 0.00000 |
| E | 0.00000 | 0.00000 | 0.00000 | 0.00000 | 0.00000 | 0.00000 | 0.00000 | 0.00000 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |

Figure 8:
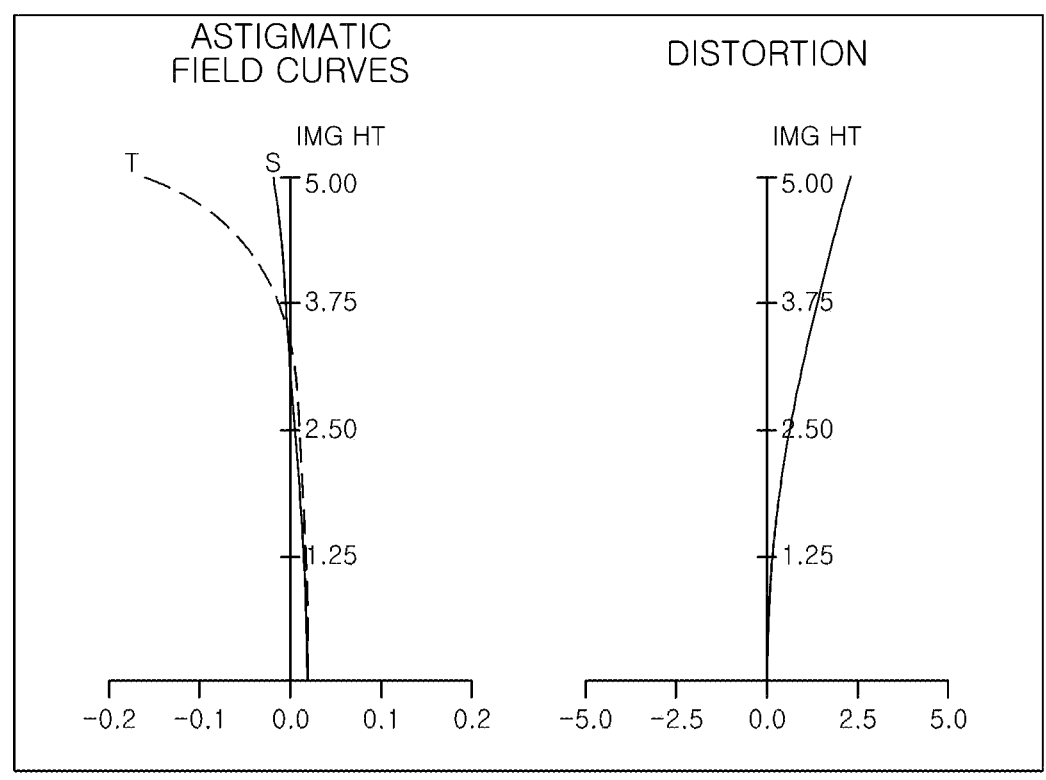
FIG. 8 shows graphs illustrating aberration characteristics of the optical imaging system illustrated in FIG. 7.

FIG. 8 shows graphs illustrating aberration characteristics of the optical imaging system 400 illustrated in FIG. 7.

Figure 9:
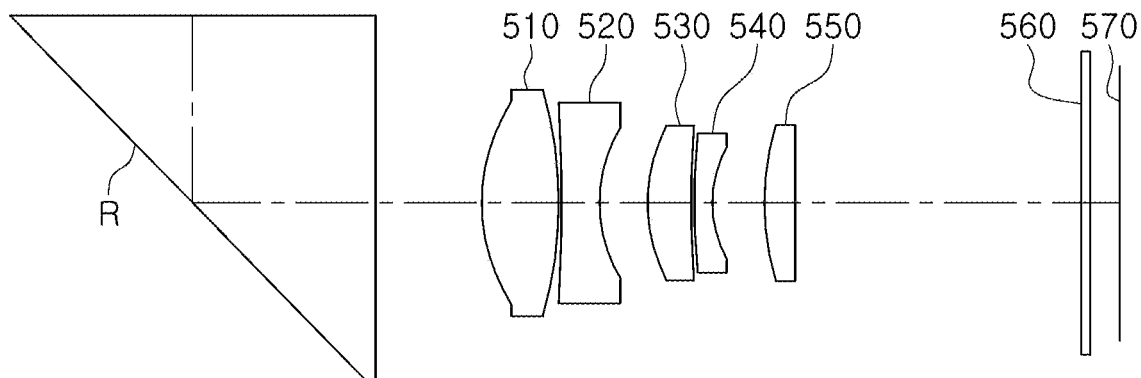
FIG. 9 is a configuration diagram of a fifth example of an optical imaging system.

FIG. 9 is a configuration diagram of a fifth example of an optical imaging system.

Referring to FIG. 9, an optical imaging system 500 includes an optical system including a first lens 510, a second lens 520, a third lens 530, a fourth lens 540, and a fifth lens 550, and further includes a filter 560 and an image sensor 570. The filter 560 may be an infrared blocking filter for blocking infrared light.

In addition, the optical imaging system 500 further includes a reflective member R disposed closer to the object side than the first lens 510 and having a reflective surface changing an optical path. The reflective member R may be a prism or a mirror.

Optical characteristics of each element (a radius of curvature, a thickness of the element or a distance between the element and a next element, a refractive index, an Abbe number, an effective radius, and a focal length) of the optical imaging system 500 are illustrated in Table 9 below. The effective radius of a lens having a non-circular shape is a maximum effective radius of the lens having the non-circular shape. A minimum effective radius of the lens having the non-circular shape is smaller than the maximum effective radius, and may be equal to or greater than 70% of the maximum effective radius.

The total focal length f of the optical imaging system 500 is 19.0028 mm, Fno is 3.16, IMG HT is 4.202 mm, FOV is 23.5°, α is 91.146°, AL1 is 22.423 mm², BFL is 9.430 mm, TTL is 18.457 mm, and PTTL is 26.957 mm.

The first lens 510 has a positive refractive power, and the first and second surfaces of the first lens 510 are convex.

The second lens 520 has a negative refractive power, the first surface of the second lens 520 is convex, and the second surface of the second lens 520 is concave.

The third lens 530 has a positive refractive power, the first surface of the third lens 530 is convex, and the second surface of the third lens 530 is concave.

The fourth lens 540 has a negative refractive power, the first surface of the fourth lens 540 is convex, and the second surface of the fourth lens 540 is concave.

The fifth lens 550 has a positive refractive power, the first surface of the fifth lens 550 is convex, and the second surface of the fifth lens 550 is concave.

Each surface of the first lens 510 to the fifth lens 550 has the aspherical surface coefficients illustrated in Table 10 below. Both the object-side surface and the image-side surface of the first lens 510 to the fifth lens 550 are aspherical surfaces.

TABLE 9

| Surface Number | Element | Radius of Curvature | Thickness or Distance | Refractive Index | Abbe Number | Effective Radius | Focal Length |
|---|---|---|---|---|---|---|---|
| S1 | Prism | Infinity | 5.500 | 1.723 | 29.5 | 5.000 | |
| S2 | | Infinity | 5.500 | 1.723 | 29.5 | 7.000 | |
| S3 | | Infinity | 3.000 | | | 5.000 | |
| S4 | First Lens | 5.07 | 2.200 | 1.537 | 55.7 | 2.965 | 7.096 |
| S5 | | −12.96 | 0.065 | | | 2.673 | |
| S6 | Second Lens | 359.79 | 1.151 | 1.621 | 26.0 | 2.541 | −6.393 |
| S7 | | 3.92 | 1.400 | | | 2.117 | |
| S8 | Third Lens | 4.60 | 1.200 | 1.679 | 19.2 | 2.011 | 9.547 |
| S9 | | 14.16 | 0.111 | | | 1.823 | |
| S10 | Fourth Lens | 11.34 | 0.500 | 1.621 | 26.0 | 1.778 | −6.954927 |
| S11 | | 3.07 | 1.500 | | | 1.590 | |
| S12 | Fifth Lens | 6.98 | 0.899 | 1.547 | 56.1 | 2.030 | 16.306237 |
| S13 | | 30.81 | 8.459 | | | 2.030 | |
| S14 | Filter | Infinity | 0.210 | 1.519 | 64.2 | 3.989 | |
| S15 | | Infinity | 0.762 | | | 4.021 | |
| S16 | Imaging Plane | Infinity | | | | 4.202 | |

TABLE 10

|   | S4 | S5 | S6 | S7 | S8 | S9 | S10 | S11 | S12 | S13 |
|---|---|---|---|---|---|---|---|---|---|---|
| K | −0.68631 | −2.34166 | −99.0000 | 0.07210 | 0.06836 | −4.00987 | 3.54991 | −0.09767 | −0.62797 | −21.9438 |
| A | 0.00026 | 0.00075 | −0.00146 | −0.00325 | −0.00275 | −0.00302 | −0.00262 | −0.00599 | −0.00531 | −0.00383 |
| B | −0.00001 | −0.00002 | 0.00012 | 0.00003 | 0.00019 | 0.00030 | −0.00005 | 0.00033 | 0.00017 | −0.00010 |
| C | 0.00000 | 0.00000 | 0.00000 | −0.00001 | −0.00001 | −0.00002 | 0.00004 | 0.00010 | 0.00006 | 0.00002 |
| D | 0.00000 | 0.00000 | 0.00000 | 0.00000 | 0.00000 | 0.00000 | −0.00001 | 0.00002 | 0.00001 | 0.00001 |
| E | 0.00000 | 0.00000 | 0.00000 | 0.00000 | 0.00000 | 0.00000 | 0.00000 | −0.00001 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |

Figure 10:
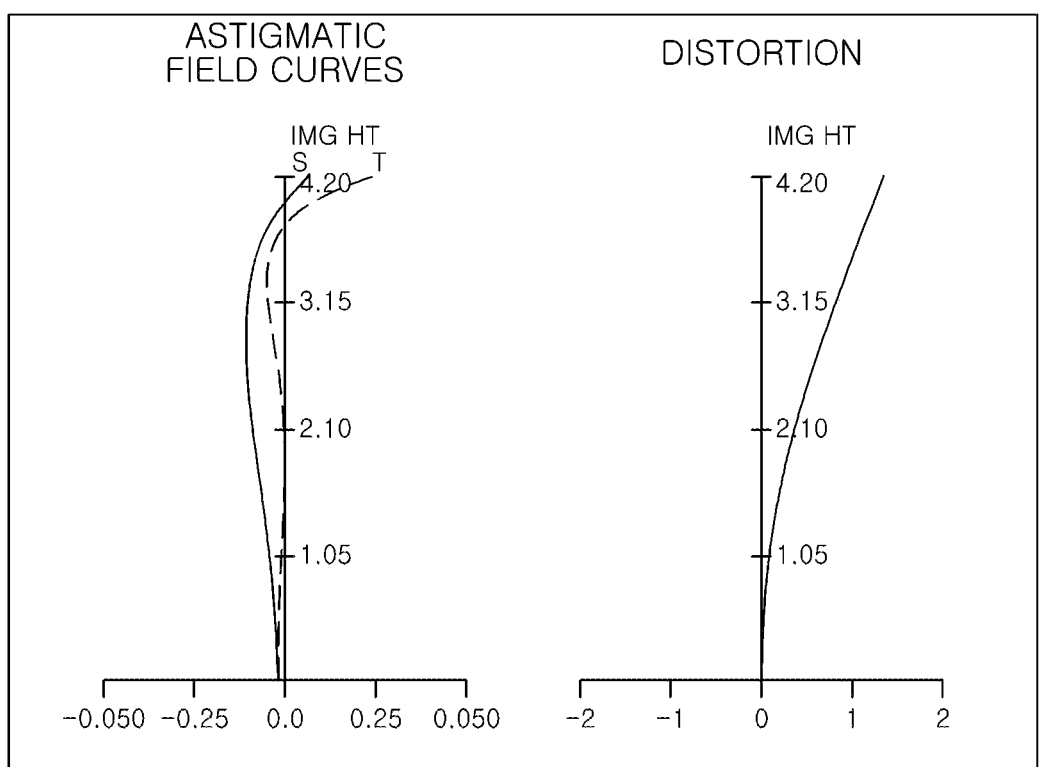
FIG. 10 shows graphs illustrating aberration characteristics of the optical imaging system illustrated in FIG. 9.

FIG. 10 shows graphs illustrating aberration characteristics of the optical imaging system 500 illustrated in FIG. 9.

Figure 11:
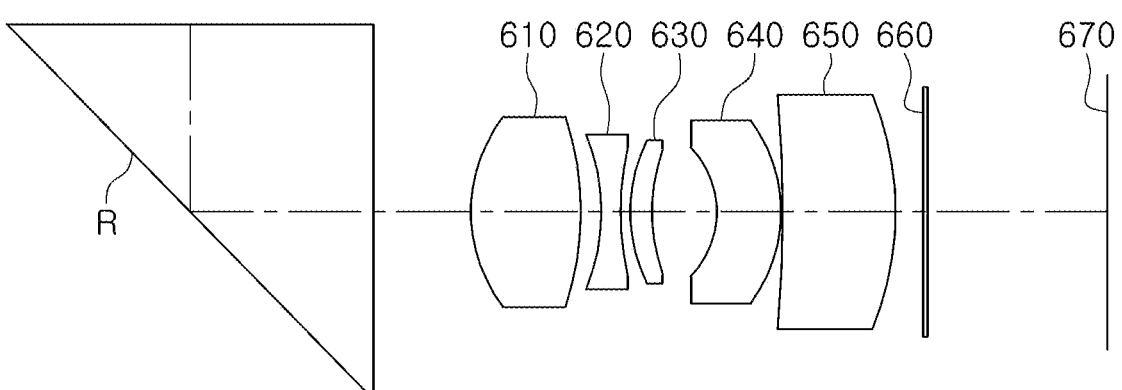
FIG. 11 is a configuration diagram of a sixth example of an optical imaging system.

FIG. 11 is a configuration diagram of a sixth example of an optical imaging system.

Referring to FIG. 11, an optical imaging system 600 includes an optical system including a first lens 610, a second lens 620, a third lens 630, a fourth lens 640, and a fifth lens 650, and further includes a filter 660 and an image sensor 670. The filter 660 may be an infrared blocking filter for blocking infrared light.

In addition, the optical imaging system 600 further includes a reflective member R disposed closer to the object side than the first lens 610 and having a reflective surface changing an optical path. The reflective member R may be a prism or a mirror.

Optical characteristics of each element (a radius of curvature, a thickness of the element or a distance between the element and a next element, a refractive index, an Abbe number, an effective radius, and a focal length) of the optical imaging system 600 are illustrated in Table 11 below. The effective radius of a lens having a non-circular shape is a maximum effective radius of the lens having the non-circular shape. A minimum effective radius of the lens having the non-circular shape is smaller than the maximum effective radius, and may be equal to or greater than 70% of the maximum effective radius.

The total focal length f of the optical imaging system 600 is 189974 mm, Fno is 3.65, IMG HT is 4.004 mm, FOV is 23.3°, $\alpha$ is 91.146°, AL1 is 17.242 mm$^2$, BFL is 6.589 mm, TTL is 19.574 mm, and PTTL is 28.074 mm.

The first lens 610 has a positive refractive power, and the first and second surfaces of the first lens 610 are convex.

The second lens 620 has a negative refractive power, and the first and second surfaces of the second lens 620 are concave.

The third lens 630 has a positive refractive power, the first surface of the third lens 630 is convex, and the second surface of the third lens 630 is concave.

The fourth lens 640 has a positive refractive power, the first surface of the fourth lens 640 is concave, and the second surface of the fourth lens 640 is convex.

The fifth lens 650 has a positive refractive power, the first surface of the fifth lens 650 is concave, and the second surface of the fifth lens 650 is convex.

Each surface of the first lens 610 to the fifth lens 650 has the aspherical surface coefficients illustrated in Table 12 below. Both the object-side surface and the image-side surface of the first lens 610 to the fifth lens 650 are aspherical surfaces.

TABLE 11

| Surface Number | Element | Radius of Curvature | Thickness or Distance | Refractive Index | Abbe Number | Effective Radius | Focal Length |
|---|---|---|---|---|---|---|---|
| S1 | Prism | Infinity | 5.500 | 1.723 | 29.5 | 5.000 | |
| S2 | | Infinity | 5.500 | 1.723 | 29.5 | 7.000 | |
| S3 | | Infinity | 3.000 | | | 5.000 | |
| S4 | First Lens | 4.55 | 3.400 | 1.537 | 55.7 | 2.600 | 5.786 |
| S5 | | −7.24 | 0.648 | | | 2.313 | |
| S6 | Second Lens | −2.86 | 0.541 | 1.621 | 26.0 | 2.132 | −4.395059 |
| S7 | | 62.14 | 0.278 | | | 1.989 | |
| S8 | Third Lens | 3.25 | 0.638 | 1.679 | 19.2 | 1.996 | 19.386 |
| S9 | | 3.98 | 2.094 | | | 1.922 | |
| S10 | Fourth Lens | −3.91 | 1.886 | 1.642 | 23.9 | 2.000 | 378.79197 |
| S11 | | −4.58 | 0.100 | | | 2.504 | |
| S12 | Fifth Lens | −9.63 | 3.400 | 1.571 | 37.4 | 2.640 | 75.108181 |
| S13 | | −8.87 | 1.020 | | | 3.200 | |
| S14 | Filter | Infinity | 0.110 | 1.519 | 64.2 | 3.371 | |
| S15 | | Infinity | 5.459 | | | 3.379 | |
| S16 | Imaging Plane | Infinity | | | | 4.004 | |

TABLE 12

| | S4 | S5 | S6 | S7 | S8 | S9 | S10 | S11 | S12 | S13 |
|---|---|---|---|---|---|---|---|---|---|---|
| K | −0.94601 | 0.00000 | 0.00000 | 0.00000 | 0.00000 | 0.00000 | 0.00000 | 0.00000 | 0.00000 | 0.00000 |
| A | 0.00129 | 0.00367 | 0.04849 | 0.01891 | −0.02513 | −0.01496 | −0.02237 | 0.00669 | 0.01917 | 0.00239 |
| B | −0.00015 | 0.00080 | −0.01066 | 0.00612 | 0.01883 | 0.00699 | 0.00012 | −0.00575 | −0.00768 | −0.00020 |
| C | 0.00012 | −0.00097 | −0.00016 | −0.00887 | −0.01276 | −0.00369 | 0.00015 | 0.00205 | 0.00245 | 0.00002 |
| D | −0.00005 | 0.00047 | 0.00232 | 0.00427 | 0.00510 | −0.00007 | 0.00011 | −0.00036 | −0.00050 | −0.00001 |
| E | 0.00001 | −0.00014 | −0.00108 | −0.00108 | −0.00133 | 0.00098 | 0.00003 | 0.00003 | 0.00006 | 0.00000 |
| F | 0.00000 | 0.00002 | 0.00041 | 0.00015 | 0.00028 | −0.00045 | −0.00002 | 0.00000 | 0.00000 | 0.00000 |
| G | 0.00000 | 0.00000 | −0.00007 | −0.00001 | −0.00005 | 0.00009 | 0.00000 | 0.00000 | 0.00000 | 0.00000 |
| H | 0.00000 | 0.00000 | 0.00001 | 0.00000 | 0.00001 | −0.00001 | 0.00000 | 0.00000 | 0.00000 | 0.00000 |

Figure 12:
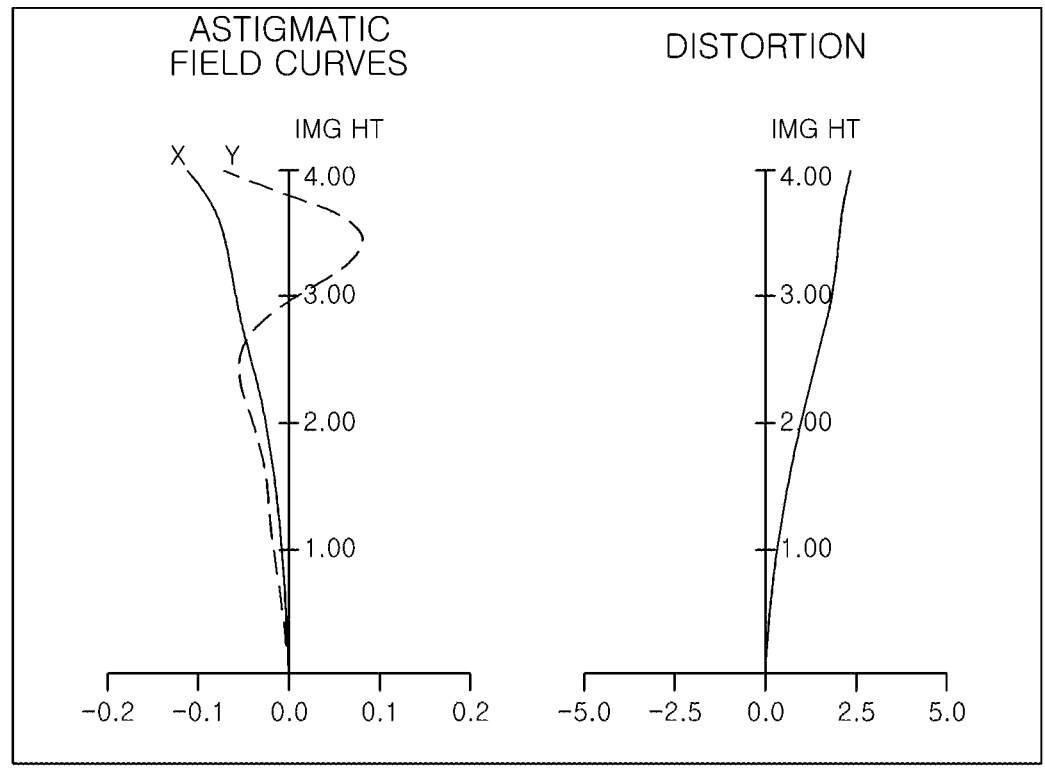
FIG. 12 shows graphs illustrating aberration characteristics of the optical imaging system illustrated in FIG. 11.

FIG. 12 shows graphs illustrating aberration characteristics of the optical imaging system 600 illustrated in FIG. 11.

Figure 13:
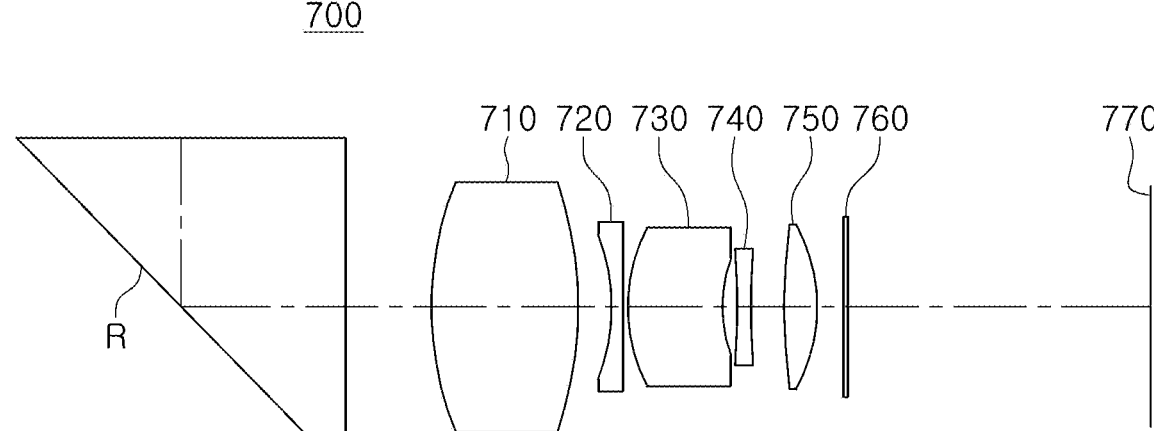
FIG. 13 is a configuration diagram of a seventh example of an optical imaging system.
Figure 14:
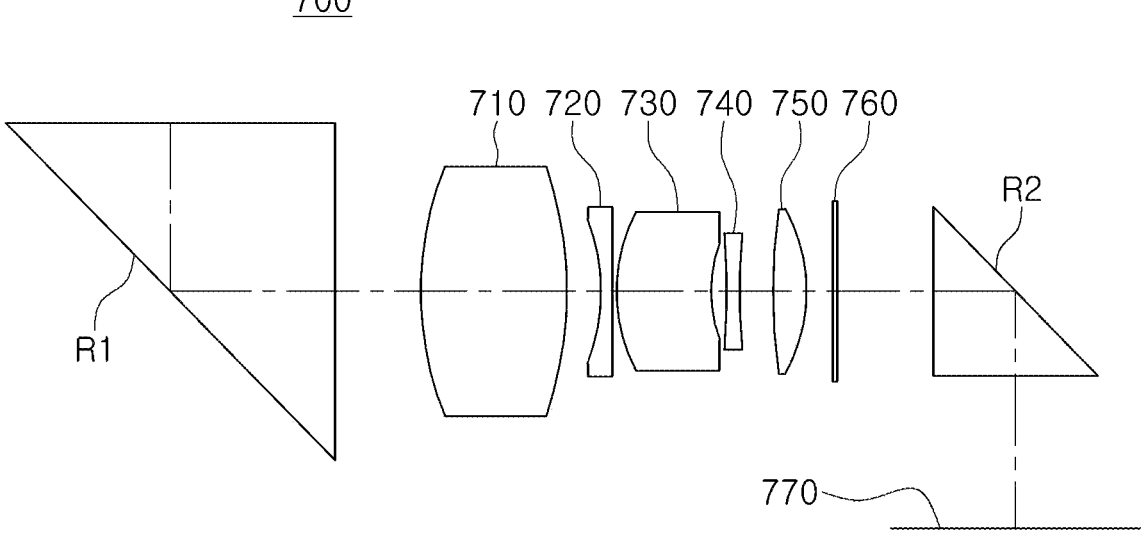
FIG. 14 is a configuration diagram of a modification of the seventh example of the optical imaging system.

FIG. 13 is a configuration diagram of a seventh example of an optical imaging system, and FIG. 14 is a configuration diagram of a modification of the seventh example of the optical imaging system.

Referring to FIGS. 13 and 14, an optical imaging system 700 includes an optical system including a first lens 710, a second lens 720, a third lens 730, a fourth lens 740, and a fifth lens 750, and further includes a filter 760 and an image sensor 770. The filter 760 may be an infrared blocking filter for blocking infrared light.

Referring to FIG. 13, the optical imaging system 700 further includes a reflective member R disposed closer to the object side than the first lens 710 and having a reflective surface changing an optical path. The reflective member R may be a prism or a mirror.

Light incident on the first reflective member R1 is folded by the first reflective member R1 and passes through the first lens 710 to the fifth lens 750 and the filter 760.

The light passing through the first lens 710 to the fifth lens 750 and the filter 760 is folded by the second reflective member R2 and received by the image sensor 770.

Optical characteristics of each element (a radius of curvature, a thickness of the element or a distance between the element and a next element, a refractive index, an Abbe number, an effective radius, and a focal length) of the optical imaging systems 700 illustrated in FIGS. 13 and 14 are illustrated in Table 13 below. The effective radius of a lens having a non-circular shape is a maximum effective radius of the lens having the non-circular shape. A minimum effective radius of the lens having the non-circular shape is smaller than the maximum effective radius, and may be equal to or greater than 70% of the maximum effective radius.

TABLE 13

| Surface Number | Element | Radius of Curvature | Thickness or Distance | Refractive Index | Abbe Number | Effective Radius | Focal Length |
|---|---|---|---|---|---|---|---|
| S1 | Prism | Infinity | 5.500 | 1.723 | 29.5 | 5.000 | |
| S2 | | Infinity | 5.500 | 1.723 | 29.5 | 7.000 | |
| S3 | | Infinity | 3.000 | | | 5.000 | |
| S4 | First Lens | 11.53 | 5.000 | 1.537 | 55.7 | 3.800 | 11.677 |
| S5 | | −11.65 | 1.178 | | | 3.078 | |
| S6 | Second Lens | −5.77 | 0.440 | 1.621 | 26.0 | 2.585 | −10.86643 |
| S7 | | −40.89 | 0.100 | | | 2.477 | |
| S8 | Third Lens | 5.56 | 3.236 | 1.621 | 26.0 | 2.376 | −111.711 |
| S9 | | 4.00 | 0.512 | | | 1.616 | |
| S10 | Fourth Lens | −14.57 | 0.471 | 1.621 | 26.0 | 1.600 | −16.48969 |
| S11 | | 34.80 | 1.198 | | | 1.800 | |
| S12 | Fifth Lens | 36.54 | 1.119 | 1.571 | 37.4 | 2.419 | 8.5110104 |
| S13 | | −5.55 | 1.020 | | | 2.528 | |
| S14 | Filter | Infinity | 0.110 | 1.519 | 64.2 | 2.754 | |
| S15 | | Infinity | 10.348 | | | 2.764 | |
| S16 | Imaging Plane | Infinity | | | | 4.000 | |

Referring to FIG. 14, a modification of the optical imaging system 700 further includes a first reflective member R1 disposed closer to the object side than the first lens 710 and having a reflective surface changing an optical path. In addition, the optical imaging system 700 further includes a second reflective member R2 disposed between the filter 760 and the image sensor 770 and having a reflective surface changing the optical path. The first reflective member R1 and the second reflective member R2 may be prisms or mirrors.

The total focal length f of the optical imaging systems 700 illustrated in FIGS. 13 and 14 is 20.1457 mm, Fno is 3.42, IMG HT is 4.000 mm, FOV is 21.7°, α is 91.146°, AL1 is 36.831 mm², BFL is 11.478 mm, TTL is 24.732 mm, and PTTL is 33.232 mm.

The first lens 710 has a positive refractive power, and the first and second surfaces of the first lens 710 are convex.

The second lens 720 has a negative refractive power, the first surface of the second lens 720 is concave, and the second surface of the second lens 720 is convex.

The third lens 730 has a negative refractive power, the first surface of the third lens 730 is convex, and the second surface of the third lens 730 is concave.

The fourth lens 740 has a negative refractive power, and the first and second surfaces of the fourth lens 740 are concave.

The fifth lens 750 has a positive refractive power, and the first and second surfaces of the fifth lens 750 are convex.

Each surface of the first lens 710 to the fifth lens 750 of the optical imaging systems 700 illustrated in FIGS. 13 and 14 has the aspherical surface coefficients illustrated in Table 14 below. Both the object-side surface and the image-side surface of the first lens 710 to the fifth lens 750 are aspherical surfaces.

Figure 17:
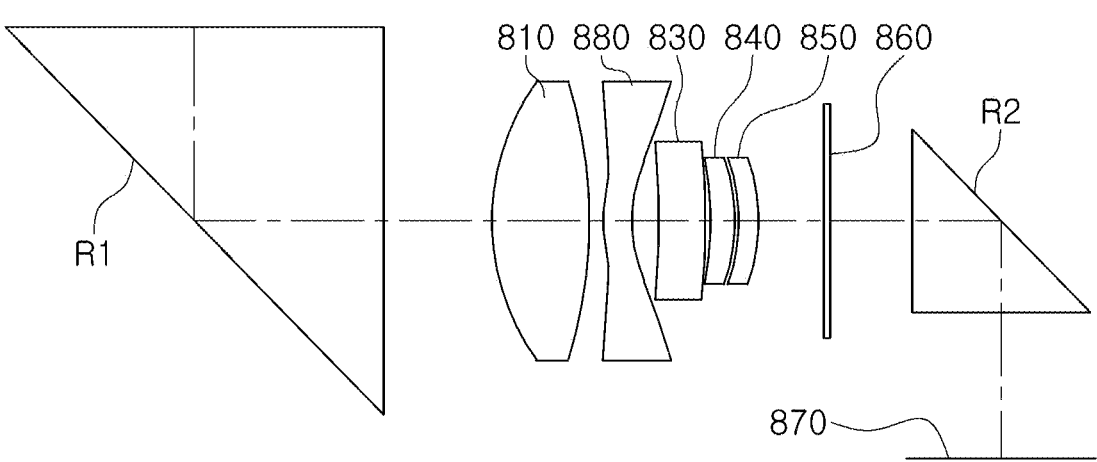
FIG. 17 is a configuration diagram of a modification of the eighth example of the optical imaging system.

Referring to FIG. 17, a modification of the optical imaging system 800 further includes a first reflective member R1 disposed closer to the object side than the first lens 810 and having a reflective surface changing an optical path. In addition, the optical imaging system 800 further includes a second reflective member R2 disposed between the filter 860 and the image sensor 870 and having a reflective surface changing the optical path. The first reflective member R1 and the second reflective member R2 may be prisms or mirrors.

Light incident on the first reflective member R1 is folded by the first reflective member R1 and passes through the first lens 810 to the fifth lens 850 and the filter 860.

TABLE 14

|  | S4 | S5 | S6 | S7 | S8 | S9 | S10 | S11 | S12 | S13 |
|---|---|---|---|---|---|---|---|---|---|---|
| K | −0.66732 | 0.00000 | 0.00000 | 0.00000 | 0.00000 | 0.00000 | 0.00000 | 0.00000 | 0.00000 | 0.00000 |
| A | 0.00017 | −0.00047 | 0.00114 | −0.00101 | −0.00303 | −0.00547 | −0.00032 | 0.00654 | 0.00253 | 0.00049 |
| B | 0.00001 | 0.00030 | 0.00169 | 0.00243 | 0.00124 | 0.00042 | −0.00053 | −0.00117 | −0.00040 | −0.00006 |
| C | 0.00000 | −0.00005 | −0.00057 | −0.00079 | −0.00034 | 0.00035 | 0.00015 | −0.00007 | 0.00002 | 0.00000 |
| D | 0.00000 | 0.00001 | 0.00010 | 0.00014 | 0.00005 | −0.00015 | −0.00002 | 0.00006 | 0.00000 | 0.00000 |
| E | 0.00000 | 0.00000 | −0.00001 | −0.00001 | −0.00001 | 0.00003 | 0.00000 | −0.00001 | 0.00000 | 0.00000 |
| F | 0.00000 | 0.00000 | 0.00000 | 0.00000 | 0.00000 | 0.00000 | 0.00000 | 0.00000 | 0.00000 | 0.00000 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |

Figure 15:
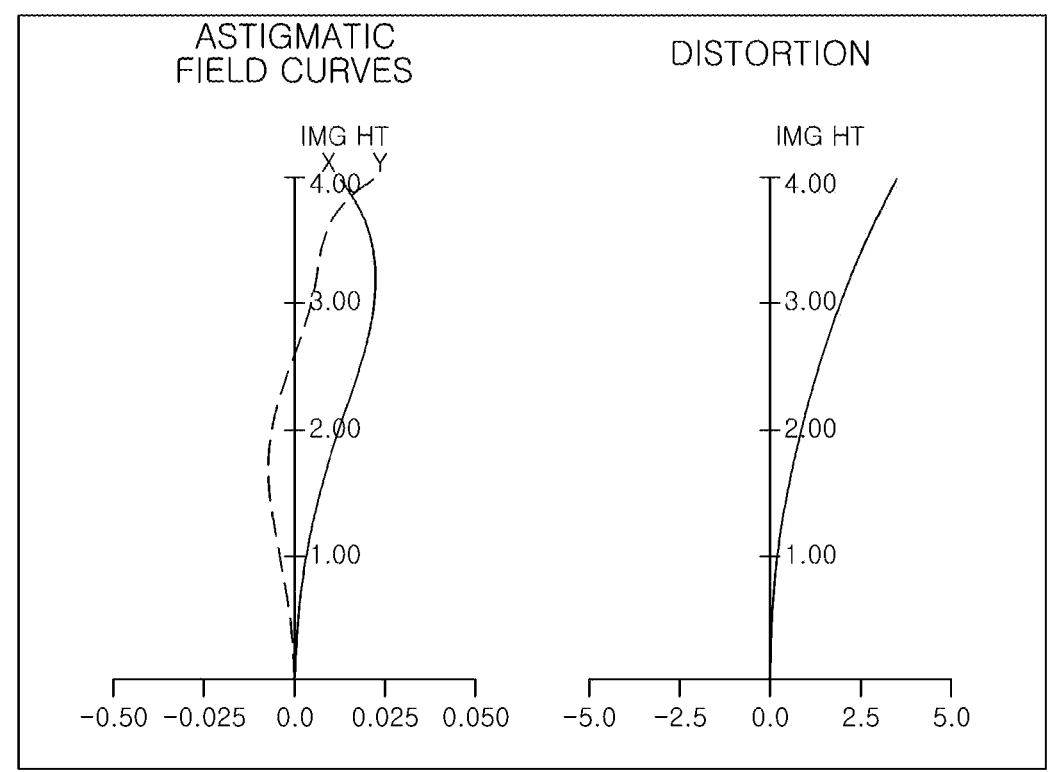
FIG. 15 shows graphs illustrating aberration characteristics of the optical imaging systems illustrated in FIGS. 13 and 14.

FIG. 15 shows graphs illustrating aberration characteristics of the optical imaging systems 700 illustrated in FIGS. 13 and 14.

Figure 16:
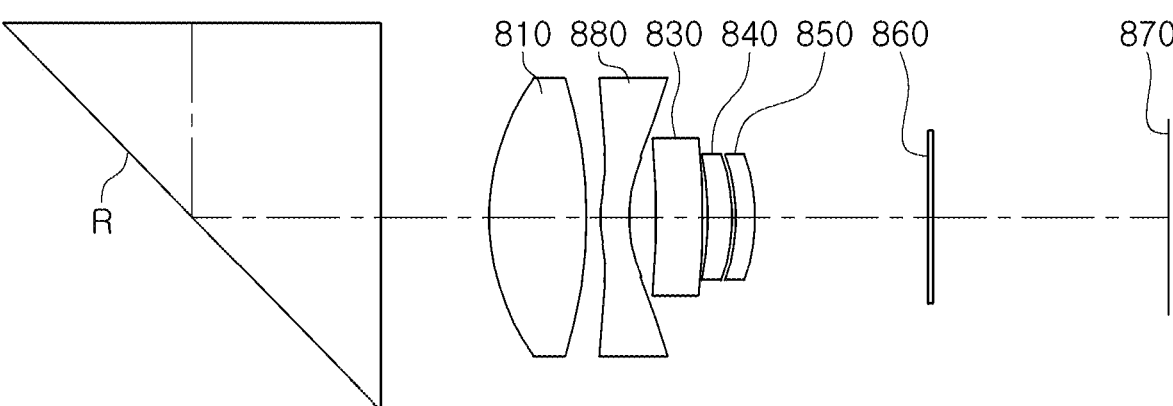
FIG. 16 is a configuration diagram of an eighth example of an optical imaging system.

FIG. 16 is a configuration diagram of a seventh example of an optical imaging system, and FIG. 17 is a configuration diagram of a modification of the seventh example of the optical imaging system.

Referring to FIGS. 16 and 17, an optical imaging system 800 includes an optical system including a first lens 810, a second lens 820, a third lens 830, a fourth lens 840, and a fifth lens 850, and further includes a filter 860 and an image sensor 870. The filter 860 may be an infrared blocking filter for blocking infrared light.

Referring to FIG. 16, the optical imaging system 800 further includes a reflective member R disposed closer to the object side than the first lens 810 and having a reflective surface changing an optical path. The reflective member R may be a prism or a mirror.

The light passing through the first lens 810 to the fifth lens 850 and the filter 860 is folded by the second reflective member R2 and received by the image sensor 870.

Optical characteristics of each element (a radius of curvature, a thickness of the element or a distance between the element and a next element, a refractive index, an Abbe number, an effective radius, and a focal length) of the optical imaging systems 800 illustrated in FIGS. 16 and 17 are illustrated in Table 15 below. The effective radius of a lens having a non-circular shape is a maximum effective radius of the lens having the non-circular shape. The minimum effective radius of the lens having the non-circular shape is smaller than the maximum effective radius, and may be equal to or greater than 70% of the maximum effective radius.

TABLE 15

| Surface Number | Element | Radius of Curvature | Thickness or Distance | Refractive Index | Abbe Number | Effective Radius | Focal Length |
|---|---|---|---|---|---|---|---|
| S1 | Prism | Infinity | 5.500 | 1.723 | 29.5 | 5.000 | |
| S2 | | Infinity | 5.500 | 1.723 | 29.5 | 7.000 | |
| S3 | | Infinity | 3.000 | | | 5.000 | |
| S4 | First Lens | 5.76 | 2.842 | 1.537 | 55.7 | 3.500 | 7.613 |
| S5 | | −11.62 | 0.470 | | | 3.500 | |
| S6 | Second Lens | 24.95 | 0.783 | 1.621 | 26.0 | 3.500 | −7.860431 |
| S7 | | 4.03 | 0.706 | | | 2.895 | |
| S8 | Third Lens | 87.90 | 1.347 | 1.679 | 19.2 | 2.000 | −905.423 |
| S9 | | 76.43 | 0.167 | | | 2.000 | |
| S10 | Fourth Lens | −7.28 | 0.681 | 1.642 | 23.9 | 1.600 | 39.891228 |
| S11 | | −5.88 | 0.100 | | | 1.600 | |
| S12 | Fifth Lens | −4.17 | 0.550 | 1.571 | 37.4 | 1.600 | −392.2357 |
| S13 | | −4.46 | 1.020 | | | 1.600 | |
| S14 | Filter | Infinity | 0.110 | 1.519 | 64.2 | 1.848 | |

TABLE 15-continued

| Surface Number | Element | Radius of Curvature | Thickness or Distance | Refractive Index | Abbe Number | Effective Radius | Focal Length |
|---|---|---|---|---|---|---|---|
| S15 | | Infinity | 10.777 | | | 1.862 | |
| S16 | Imaging Plane | Infinity | | | | 2.82 | |

The total focal length f of the optical imaging systems 800 illustrated in FIGS. 16 and 17 is 19 mm, Fno is 3.81, IMG HT is 2.82 mm, FOV is 23.1°, α is 91.146°, AL1 is 31.245 mm², BFL is 11.907 mm, TTL is 19.553 mm, and PTTL is 28.053 mm.

The first lens 810 has a positive refractive power, and the first and second surfaces of the first lens 810 are convex.

The second lens 820 has a negative refractive power, the first surface of the second lens 820 is convex, and the second surface of the second lens 820 is concave.

The third lens 830 has a negative refractive power, the first surface of the third lens 830 is convex, and the second surface of the third lens 830 is concave.

The fourth lens 840 has a positive refractive power, the first surface of the fourth lens 840 is concave, and the second surface of the fourth lens 840 is convex.

The fifth lens 850 has a negative refractive power, the first surface of the fifth lens 850 is concave, and the second surface of the fifth lens 850 is convex.

Each surface of the first lens 810 to the fifth lens 850 of the optical imaging systems 800 illustrated in FIGS. 16 and 17 has the aspherical surface coefficients illustrated in Table 16 below. Both the object-side surface and the image-side surface of the first lens 810 to the fifth lens 850 are aspherical surfaces.

have a non-circular shape when viewed in the optical axis direction, and the third lens L3 to the fifth lens L5 may have a circular shape when viewed in the optical axis direction. Alternatively, all of the lenses L1, L2, L3, L4 and L5 may have a non-circular shape when viewed in the optical axis direction.

Figure 22:
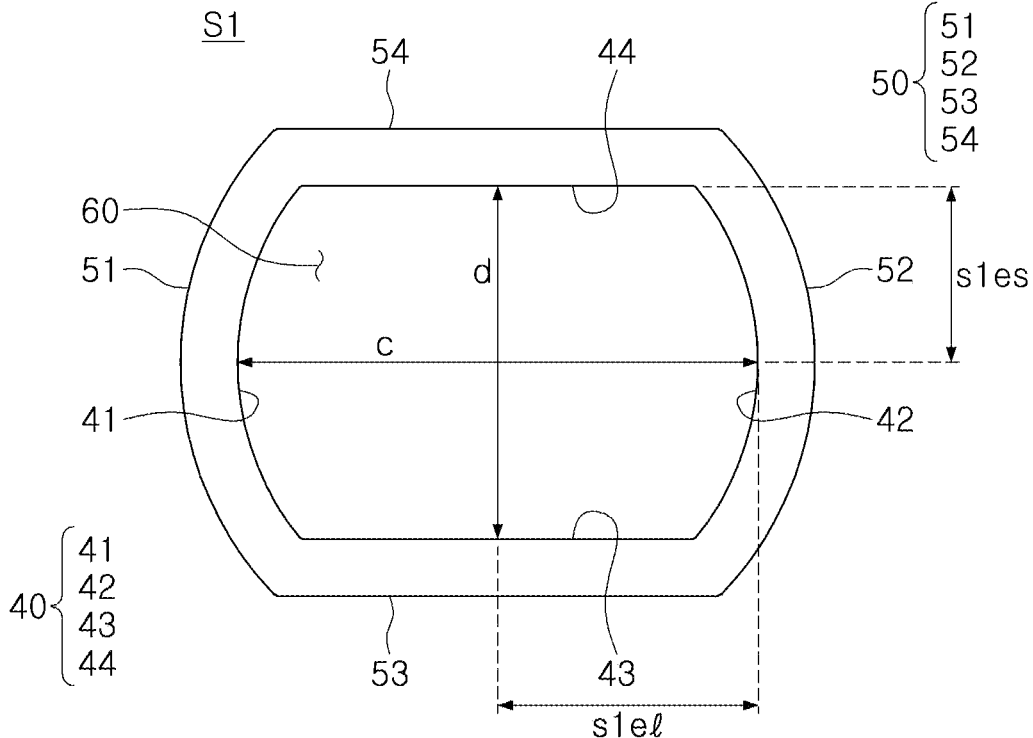
FIG. 22 is a plan view of an example of a first spacer of an optical imaging system.

FIG. 22 is a plan view of an example of a first spacer of the optical imaging system of FIG. 19.

Referring to FIG. 22, a first spacer S1 is disposed between the first lens L1 and the second lens L2 each having a non-circular shape when viewed in the optical axis direction.

The spacer S1 maintains a spacing between the first lens L1 and the second lens L2, and may also block unnecessary light. For example, the spacer may be provided with a light absorbing layer to block unnecessary light. The light absorbing layer may be a black film or black iron oxide.

In addition to the first spacer S1, the optical imaging system may further include a second spacer disposed between the second lens L2 and the third lens L3, a third spacer disposed between the third lens L3 and the fourth lens L4, and a fourth spacer disposed between the fourth lens L4 and the fifth lens L5. However, for convenience of description, only the first spacer S1 is shown in FIGS. 19 and 22.

The first spacer S1 has an opening 60 through which light passes. The opening 60 is formed by an inner peripheral

TABLE 16

| | S4 | S5 | S6 | S7 | S8 | S9 | S10 | S11 | S12 | S13 |
|---|---|---|---|---|---|---|---|---|---|---|
| K | −1.08842 | 0.00000 | 0.00000 | 0.00000 | 0.00000 | 0.00000 | 0.00000 | 0.00000 | 0.00000 | 0.00000 |
| A | 0.00050 | 0.00264 | 0.00026 | −0.00299 | −0.00569 | −0.00346 | −0.00307 | −0.01790 | −0.00107 | 0.01296 |
| B | −0.00001 | −0.00119 | −0.00257 | −0.00389 | −0.00486 | −0.00135 | 0.01074 | 0.01333 | 0.00207 | −0.00440 |
| C | 0.00000 | 0.00026 | 0.00076 | 0.00188 | 0.00299 | −0.00082 | −0.00701 | −0.00364 | 0.00163 | 0.00247 |
| D | 0.00000 | −0.00003 | −0.00013 | −0.00044 | −0.00074 | 0.00076 | 0.00235 | 0.00034 | −0.00109 | −0.00089 |
| E | 0.00000 | 0.00000 | 0.00002 | 0.00006 | 0.00010 | −0.00022 | −0.00044 | 0.00005 | 0.00026 | 0.00019 |
| F | 0.00000 | 0.00000 | 0.00000 | 0.00000 | −0.00001 | 0.00003 | 0.00005 | −0.00002 | −0.00003 | −0.00003 |
| G | 0.00000 | 0.00000 | 0.00000 | 0.00000 | 0.00000 | 0.00000 | 0.00000 | 0.00000 | 0.00000 | 0.00000 |
| H | 0.00000 | 0.00000 | 0.00000 | 0.00000 | 0.00000 | 0.00000 | 0.00000 | 0.00000 | 0.00000 | 0.00000 |

Figure 18:
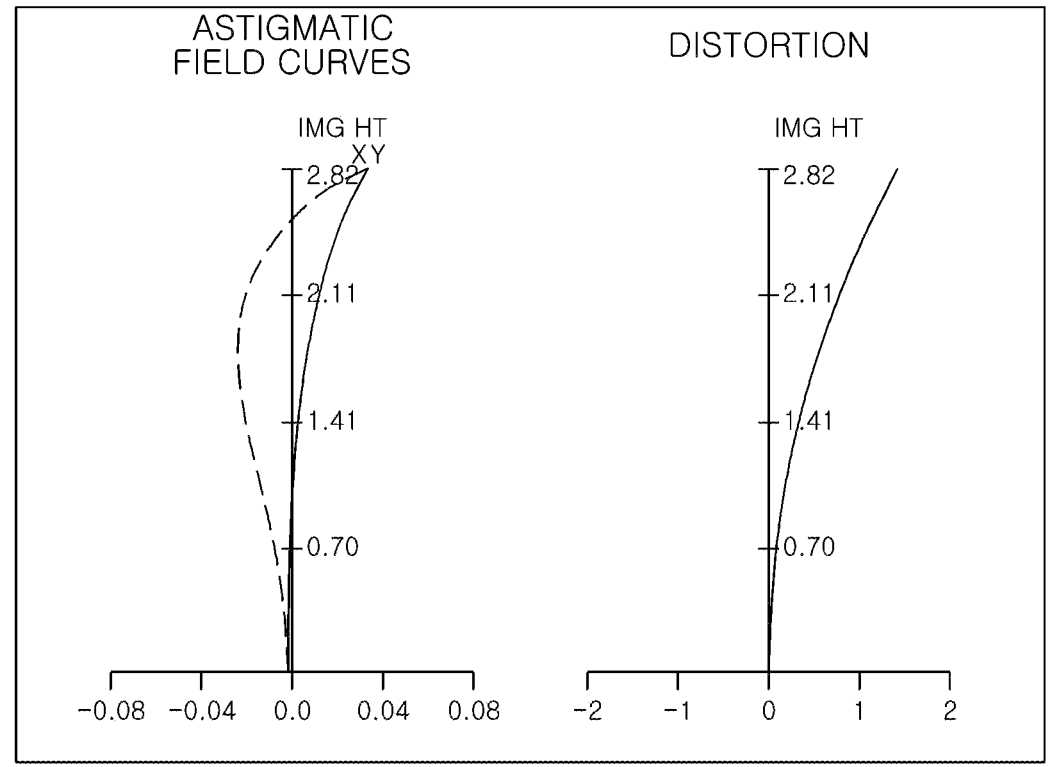
FIG. 18 shows graphs illustrating aberration characteristics of the optical imaging systems illustrated in FIGS. 16 and 17.

FIG. 18 shows aberration characteristics of the optical imaging systems 800 illustrated in FIGS. 16 and 17.

FIG. 19 is a schematic perspective view of an example of an optical imaging system.

Referring to FIG. 19, the optical imaging system includes a plurality of lenses L1, L2, L3, L4, and L5 and a spacer S1.

Although not illustrated in FIG. 19, the optical imaging system may further include a reflective member disposed closer to the object side of the optical than the plurality of lenses. In addition, the optical imaging system may further include a filter and an image sensor on the image side of the plurality of lenses.

For example, the optical imaging system may be any one of the optical imaging systems 100 to 800 described above.

Adjacent lenses of the lenses L1, L2, L3, L4, and L5 are spaced apart from each other by a predetermined distance.

At least one of the lenses L1, L2, L3, L4 and L5 has a non-circular shape when viewed in an optical axis direction. For example, the first lens L1 and the second lens L2 may surface 40 of the first spacer S1. For example, the space surrounded by the inner peripheral surface 40 of the first spacer S1 serves as the opening 60.

An outer peripheral surface 50 of the first spacer S1 is non-circular when viewed in the optical axis direction, and the inner peripheral surface 40 of the first spacer S1 is also non-circular when viewed in the optical axis direction.

The outer peripheral surface 50 of the first spacer S1 may correspond to the shapes of the first lens L1 and the second lens L2. For example, the outer peripheral surface 50 of the first spacer S1 includes a first outer surface 51, a second outer surface 52, a third outer surface 53, and a fourth outer surface 54.

The first outer surface 51 and the second outer surface 52 oppose each other and have the same shape or shapes that are mirror images of each other, and the third outer surface 53 and the fourth outer surface 54 oppose each other and have the same shape or shapes that are mirror images of each other.

When viewed in the optical axis direction, the first outer surface 51 and the second outer surface 52 are arc-shaped, and the third outer surface 53 and the fourth outer surface 54 are substantially straight-shaped.

The third outer surface 53 and the fourth outer surface 54 connect the first outer surface 51 and the second outer surface 52 to each other.

The third outer surface 53 and the fourth outer surface 54 are symmetrical about the optical axis and are parallel to each other.

The inner peripheral surface 40 of the first spacer S1 includes a first inner surface 41, a second inner surface 42, a third inner surface 43, and a fourth inner surface 44.

The first inner surface 41 and the second inner surface 42 oppose each other and have the shape or shapes that are mirror images of each other, and the third inner surface 43 and the fourth inner surface 44 oppose each other and have the shape or shapes that are mirror images of each other.

When viewed in the optical axis direction, the first inner surface 41 and the second inner surface 42 are arc-shaped, and the third inner surface 43 and the fourth inner surface 44 are substantially straight-shaped.

The third inner surface 43 and the fourth inner surface 44 connect the first inner surface 41 and the second inner surface 42 to each other.

The third inner surface 43 and the fourth inner surface 44 are symmetrical about the optical axis and are parallel to each other.

The inner peripheral surface 50 of the first spacer S1 has a major axis (c) and a minor axis (d). When viewed in the optical axis direction, a shortest line segment connecting the third inner surface 43 to the fourth inner surface 44 and passing through the optical axis is the minor axis (d), and a line segment connecting the first inner surface 41 to the second inner surface 42 and perpendicular to the minor axis (d) while passing through the optical axis is the major axis (c).

One-half of the major axis (c) is a maximum radius s1el of the opening 60, and one-half of the minor axis (d) is a minimum radius s1es of the opening 60.

FIGS. 23 to 26 are rear views of examples of a portable electronic device equipped with a plurality of camera modules.

Referring to FIGS. 23 to 26, a portable electronic device 1 may be any portable electronic device equipped with a plurality of camera modules, such as a mobile communication terminal, a smartphone, or a tablet PC.

Each of the plurality of camera modules includes an optical imaging system.

In FIGS. 23 to 26, a camera module 2 includes any one of the optical imaging systems 100 to 800 described above.

The camera module 2 folds the traveling direction of light using one or two reflective members.

The optical axis of the camera module 2 is perpendicular to the thickness direction of the portable electronic device 1 (a Z-axis direction, which is a direction from the front surface to the rear surface of the portable electronic device 1, or vice versa).

For example, the optical axis of the camera module 2 may be oriented in the width direction (a Y-axis direction) or the length direction (an X-axis direction) of the portable electronic device 1.

Therefore, even if the camera module 2 is a telephoto camera module having a relatively long focal length, the thickness of the portable electronic device 1 may be prevented from increasing. Accordingly, the thickness of the portable electronic device 1 may be reduced.

Figure 23:
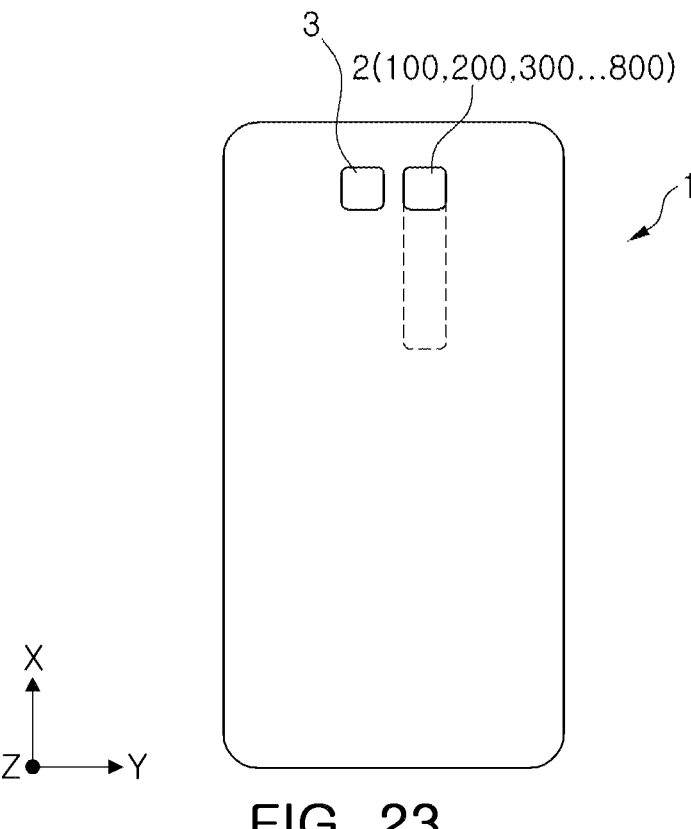
FIGS. 23 to 26 are rear views of examples of portable electronic devices equipped with a plurality of camera modules.

Referring to FIG. 23, the portable electronic device 1 includes a first camera module 2 and a second camera module 3. For example, the portable electronic device 1 may include a dual camera module including the first camera module 2 and the second camera module 3.

The optical axes of the first camera module 2 and the second camera module 3 are oriented in different directions. For example, the optical axis of the first camera module 2 is oriented in the X-axis direction, and the optical axis of the second camera module 3 is oriented in the Z-axis direction.

In addition, the first camera module 2 and the second camera module 3 are configured to have different angles of view and different focal lengths.

For example, the first camera module 2 is a telephoto camera module configured to have a relatively narrow angle of view and a relatively long focal length, and the second camera module 3 is a wide-angle camera module configured to have a relatively wide angle of view and a relatively short focal length.

As an example, the angle of view of the first camera module 2 is narrower than 30°. For example, the angle of view of the first camera module 2 may be in a range of 10° to 30°. The angle of view of the second camera module 3 may be in a range of 75° to 85°.

The first camera module 2 may have an Fno that satisfies $2.8 \le Fno < 5$. The second camera module 3 may have an Fno that satisfies $1.4 \le Fno \le 2.4$.

By designing the first camera module 2 and the second camera module 3 to have different angles of view and different focal lengths, subjects at difference distances may be imaged.

Figure 24:
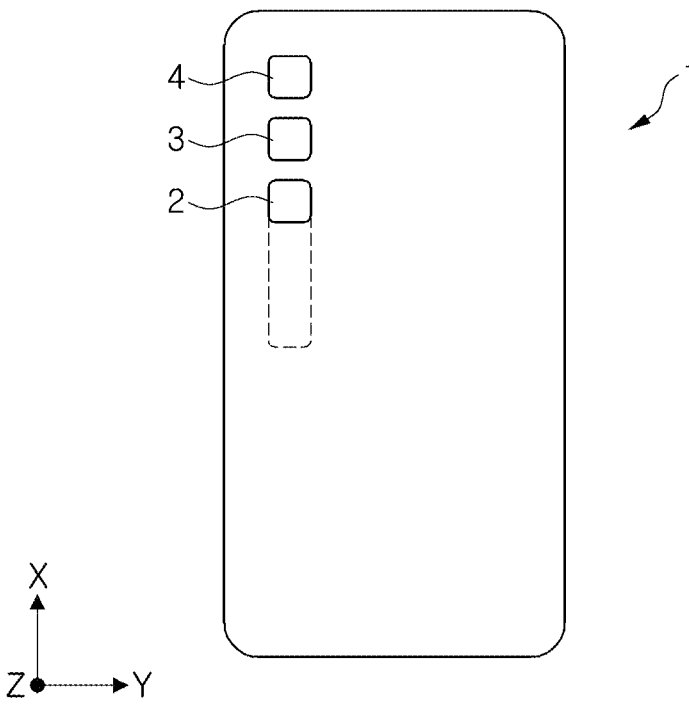

Referring to FIG. 24, the portable electronic device includes a first camera module 2, a second camera module 3, and a third camera module 4. For example, the portable electronic device 1 may include a triple camera module including the first camera module 2, the second camera module 3, and the third camera module 4. The first camera module 2 to the third camera module 4 may be arranged in the width direction (the Y-axis direction) or the length direction (the X-axis direction) of the portable electronic device 1.

The optical axis of the first camera module 2 is oriented in a different direction than the optical axis of the second camera module 3 and the optical axis of the third camera module 4. For example, the optical axis of the first camera module 2 is oriented in the X-axis direction, and the optical axis of the second camera module 3 and the optical axis of the third camera module 4 are oriented in the Z-axis direction.

Also, the first camera module 2 to the third camera module 4 are configured to have different angles of view and different focal lengths.

For example, the first camera module 2 is a telephone camera module configured to have a narrowest angle of view and a longest focal length (for example, a telephoto camera), and the third camera module 4 is an ultra wide-angle camera module configured to have a widest angle of view and a shortest focal length. The second camera module 3 is a wide-angle camera module configured to have a wider angle of view and a shorter focal length than the first camera module 2 and a narrower angle of view and a longer focal length than the third camera module 4.

As an example, the angle of view of the first camera module 2 is narrower than 30°. For example, the angle of view of the first camera module 2 may be in a range of 10° to 30°. The angle of view of the second camera module 3 may be in a range of 75° to 85°. The angle of view of the third camera module 4 may be in a range of 110° to 150°.

An Fno of the first camera module 2 may satisfy 2.8≤Fno<5. An Fno of the second camera module 3 may satisfy 1.4≤Fno≤2.4. An Fno of the third camera module 4 may satisfy 2.0≤Fno≤2.4.

By designing the first camera module 2, the second camera module 3, and the fourth camera module 4 to have different angles of view and different focal lengths, subjects at different distances may be imaged.

Figure 25:
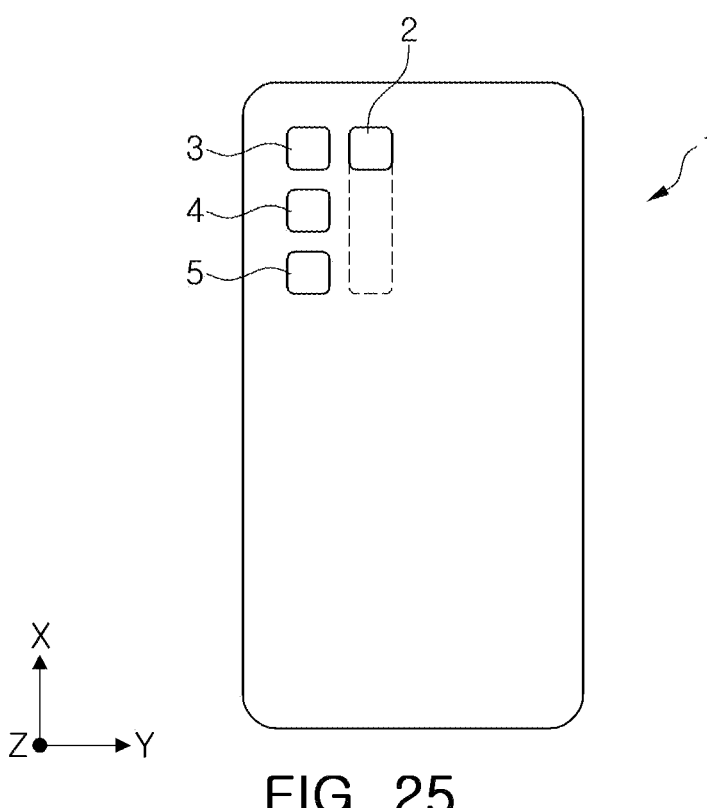

Referring to FIG. 25, the portable electronic device 1 includes a first camera module 2, a second camera module 3, a third camera module 4, and a fourth camera module 5. For example, the portable electronic device 1 may include a quad camera module including the first camera module 2, the second camera module 3, the third camera module 4, and the fourth camera module 5. The second camera module 3 to the fourth camera module 5 may be arranged in the width direction (the Y-axis direction) or the length direction (the X-axis direction) of the portable electronic device 1, and the first camera module 2 may be disposed next to the second camera module 3 to the fourth camera module 5. Accordingly, the first to fourth camera modules 2 to 5 may be arranged in a substantially quadrangular shape.

The optical axis of the first camera module 2 is oriented in a different direction than the optical axes of the second to fourth camera modules 3 to 5. For example, the optical axis of the first camera module 2 is oriented in the X-axis direction, and the optical axes of the second camera to fourth modules 3 to 5 are oriented in the Z-axis direction.

Also, the first camera module 2 to the fourth camera module 5 are configured to have different angles of view and focal lengths.

For example, the first camera module 2 is a super-telephoto camera module configured to have a narrowest angle of view and a longest focal length, and the fourth camera module 5 is an ultra-wide angle camera module configured to have a widest angle of view and a shortest focal length. The second camera module 3 is a telephone camera module configured to have a wider angle of view and a shorter focal length than the first camera module 2 and a narrower angle of view and a longer focal length than the third camera module 4. The third camera module 4 is a wide-angle camera module configured to have a wider angle of view and a shorter focal length than the second camera module 3 and a narrower angle of view and a longer focal length than the fourth camera module 5.

As an example, the angle of view of the first camera module 2 is narrower than 30°. For example, the angle of view of the first camera module 2 may be in a range of 10° to 30°. The angle of view of the second camera module 3 may be in a range of 40° to 45°. The angle of view of the third camera module 4 may be in a range of 75° to 85°. The angle of view of the fourth camera module 5 may be in a range of 110° to 150°.

An Fno of the first camera module 2 may satisfy 2.8≤Fno<5. An Fno of the second camera module 3 may satisfy 1.8≤Fno≤2.4. An Fno of the third camera module 4 may satisfy 1.4≤Fno≤2.4. An Fno of the fourth camera module 5 may satisfy 2.0≤Fno≤2.4.

By designing the first camera module 2, the second camera module 3, the third camera module 4, and the fourth camera module 5 to have different angles of view and different focal lengths, subjects at different distances may be imaged.

Figure 26:
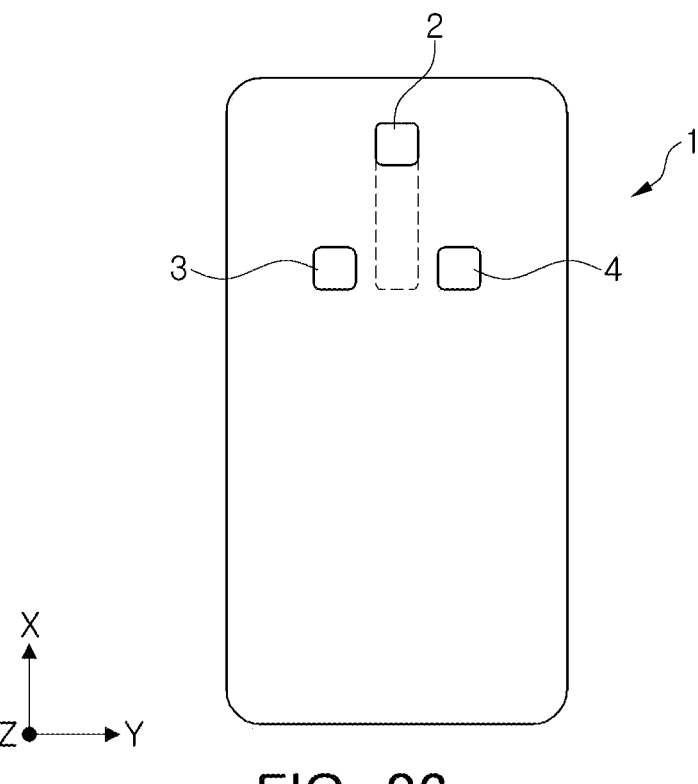

The example illustrated in FIG. 26 is basically the same as the example illustrated in FIG. 24, but differs therefrom in the arrangement of the first to third camera modules 2 to 4.

Referring to FIG. 26, the second camera module 3 and the third camera module 4 are disposed on opposite sides of the first camera module 2. The first to third camera modules 2 to 4 may be arranged in the width direction (the Y-axis direction) or the length direction (the X-axis direction) of the portable electronic device 1. Accordingly, the first to third camera modules 2 to 4 may be arranged in a substantially triangular shape.

Figure 27:
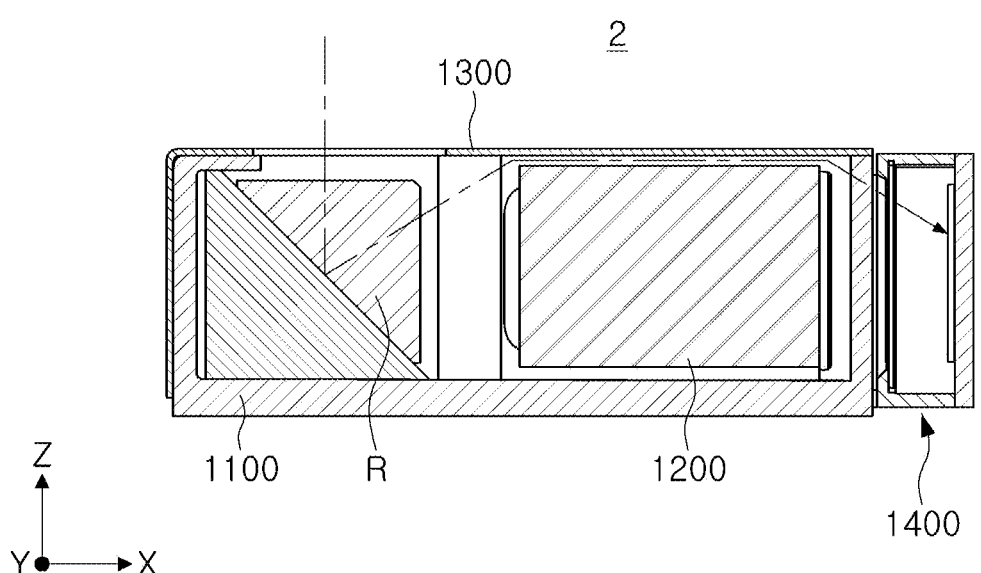
FIG. 27 is a schematic side cross-sectional view of an example of a camera module.
Figure 28:
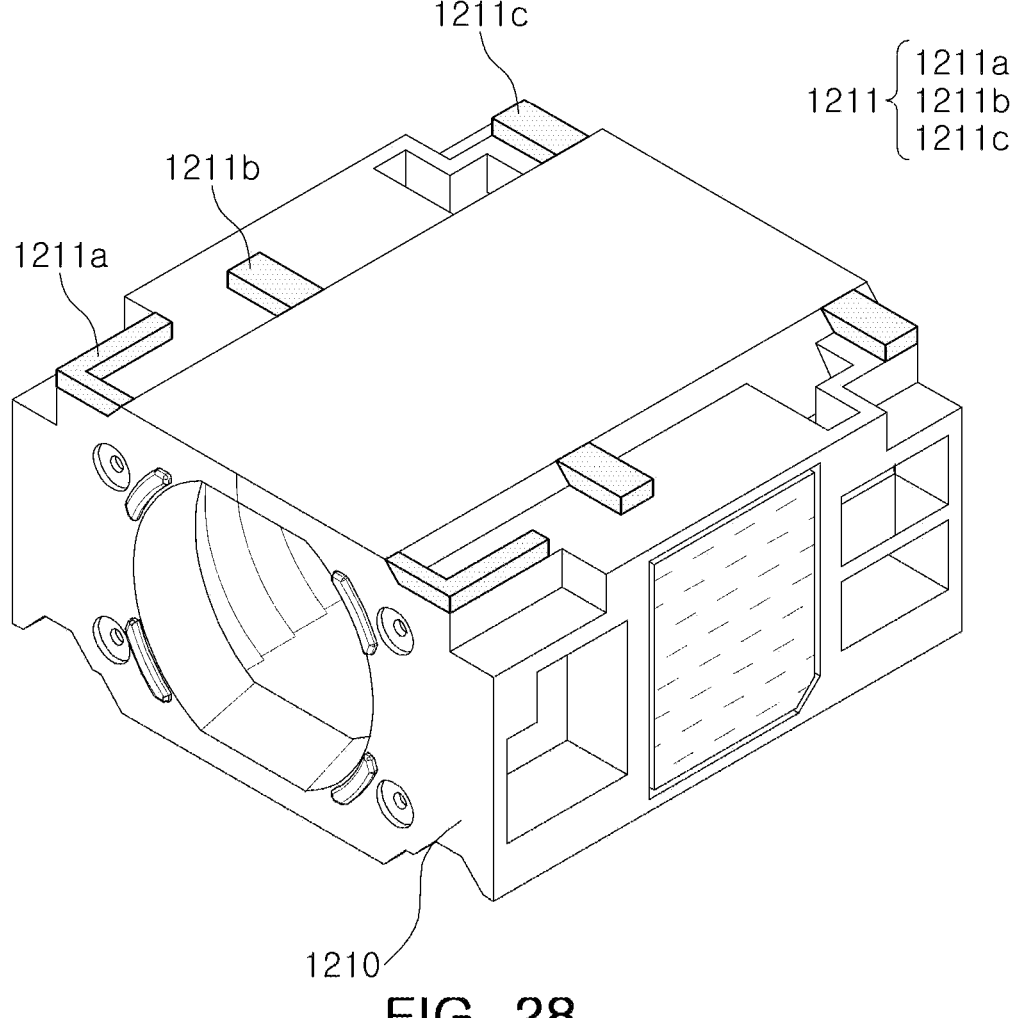
FIG. 28 is a perspective view of an example of a lens barrel of a camera module.
Figure 29A:
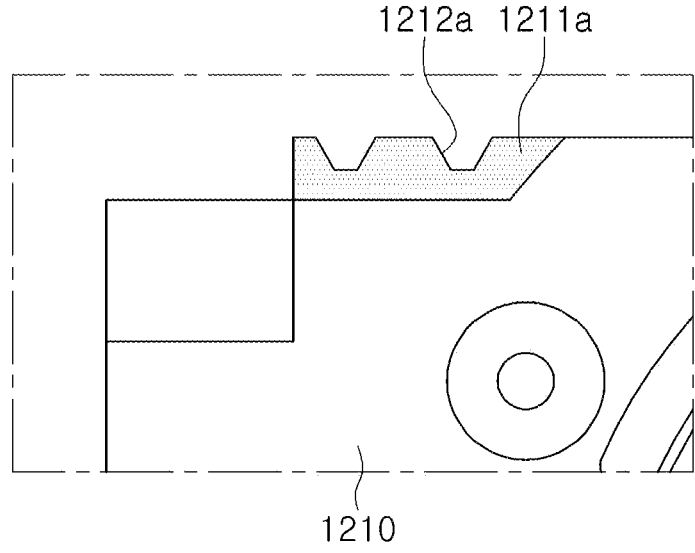
FIGS. 29A to 29C are front views illustrating examples of a portion of a lens barrel.
Figure 29B:
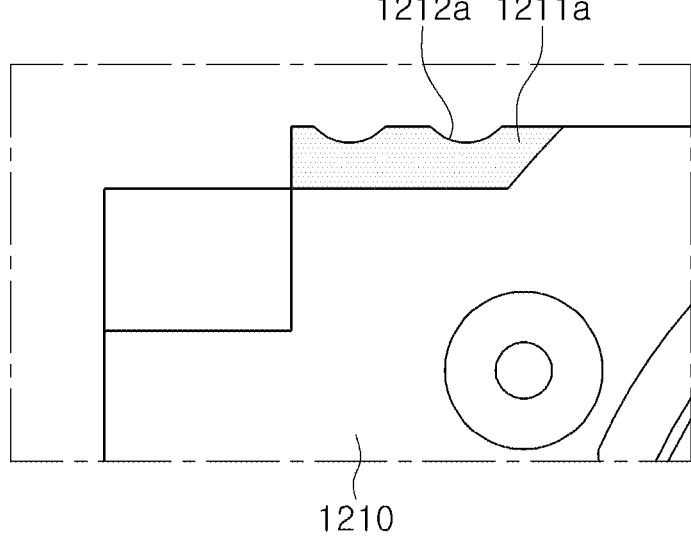
Figure 29C:
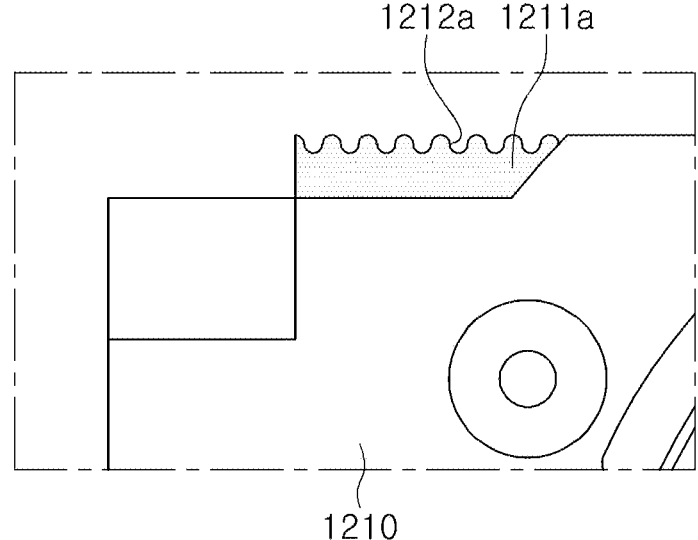

FIG. 27 is a schematic side cross-sectional view of an example of a camera module, FIG. 28 is a perspective view of an example of a lens barrel of a camera module, and FIGS. 29A to 29C are front views illustrating examples of a portion of a lens barrel.

Referring to FIG. 27, a camera module 2 includes a housing 1100, a cover 1300, a reflective member R, a lens module 1200, and an image sensor module 1400. The reflective member R may be a prism or a mirror.

The reflective member R and the lens module 1200 are sequentially disposed in the housing 1100 in a direction from a first end of the housing 1100 to a second end of the housing 1100, and the image sensor module 1400 is disposed outside the housing 1100 and is attached to the second end of the housing 1100. The housing 1100 has an internal space to accommodate the reflective member R and the lens module 1200. However, in another example, the image sensor module 1400 may be disposed in the housing 1100 between the lens module 1200 and the second end of the housing 1400. In yet another example, the image sensor 1400 may be positioned like the image sensors 770 and 870 in FIGS. 14 and 17, and another reflective member like the second reflective member R2 in FIGS. 14 and 17 may be provided to receive light from the lens module 1200 and reflect the light to the image sensor 1400.

The cover 1300 covers an upper portion of the housing 1100 and has an opening to allow light to enter and be incident on the reflective member R. A travelling direction of light incident through the opening is changed by the reflective member R and is incident on the lens module 1200.

The reflective member R is configured to change the direction in which light travels. For example, the direction in which light incident through the opening of the cover 1300 travels is changed to a direction toward the lens module 1200 by the reflective member R.

The path of light incident through the opening of the cover 1300 in the thickness direction (a Z-axis direction) of the camera module 2 is changed by the reflective member R to be substantially coincident with a optical axis direction (an X-axis direction) of the lens module 1200.

Stated another way, the reflective member R is configured to receive light from an object along a first optical axis through the opening of the cover 1300 and reflect the light along a second optical axis substantially perpendicular to the first optical axis, substantially coinciding with an optical axis of the lens module 1200, and substantially parallel to a bottom surface of the housing 1100.

The lens module 1200 includes a plurality of lenses through which the light of which the direction of travel has been changed by the reflective member R passes, and a lens barrel 1210 accommodating the plurality of lenses. The plurality of lenses may be the lenses of any one of the optical imaging systems described above with reference to FIGS. 1 to 18.

The image sensor module 1400 includes an image sensor for converting light passing through the lens module 1200 and incident on an imaging plane of the image sensor into an electrical signal, and a printed circuit board on which the image sensor is mounted. In addition, the image sensor module 1400 may further include a filter that filters light incident into the image sensor module 1400 through the lens module 1200. The filter may be an infrared blocking filter for blocking infrared light.

As illustrated in FIG. 27, some of the light reflected by the reflective member R may be stray light that is incident on a space between the cover 1300 and the lens module 1200, causing the stray light to pass through the space and be received by the image sensor, causing a flare phenomenon to occur.

However, the flare phenomenon may be prevented by blocking the stray light that is reflected by the reflective member R from passing through the space between the cover 1300 and the lens module 1200 and being received by the image sensor.

Referring to FIG. 28, an upper surface of a lens barrel 1210 is provided with a light blocking portion 1211 for blocking light from passing through the space between the lens barrel 1210 and the cover 1300 and being received by the image sensor.

The light blocking portion 1211 includes a plurality of protrusions 1211a, 1211b, and 1211c protruding toward the cover 1300 from the upper surface of the lens barrel 1210, and the plurality of protrusions are spaced apart from each other in a direction from a first end of the lens barrel 1210 facing the reflective member R to a second end of the lens barrel 1210 facing the image sensor 1400.

Referring to FIGS. 29A to 29C, the protrusion 1211a of the light blocking portion 1211 includes at least one groove 1212a extending in a direction in which light travels, i.e., in an optical axis direction (the X-axis direction in FIG. 27). The protrusions 1211b and 1211c include similar grooves.

The groove 1212a may have a shape in which a width of the groove 1212a decreases from a top of the groove 1212a to a bottom of the groove 1212a. For example, the groove 1212 may have a polygonal shape (see FIG. 29A), an arc shape (see FIG. 29B), or an undulating shape (see FIG. 29C). However, these are just examples, and the groove 1212 may have other shapes.

Figure 30A:
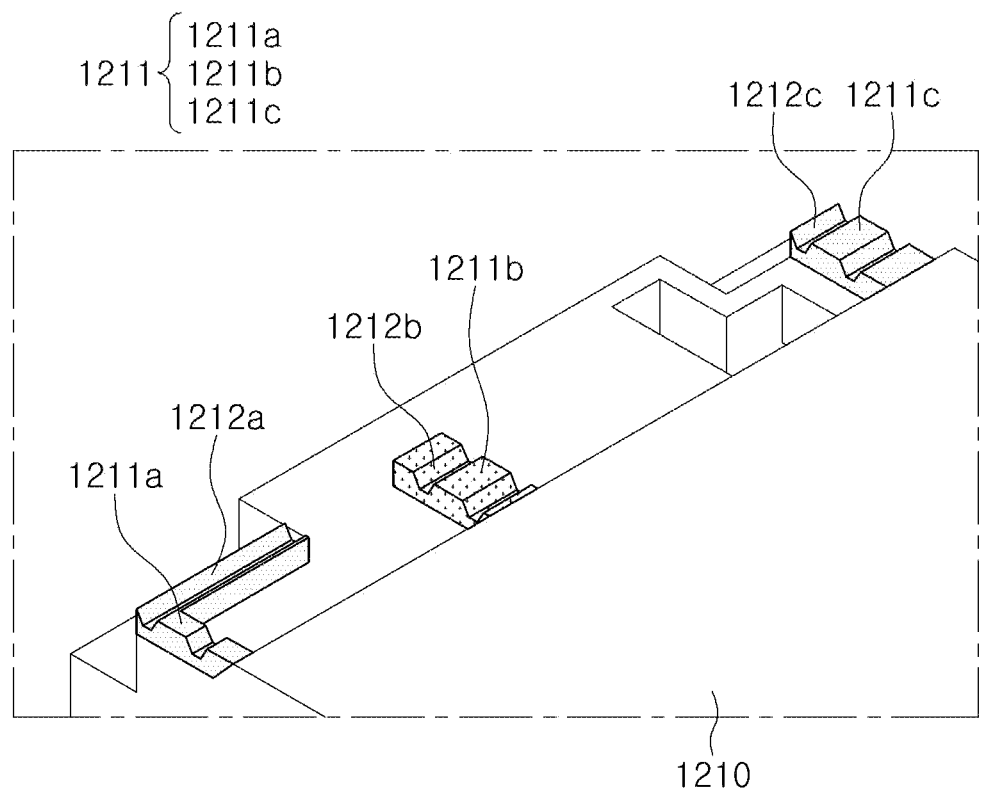
FIG. 30A is a perspective view illustrating another example of a portion of a lens barrel.
Figure 30B:
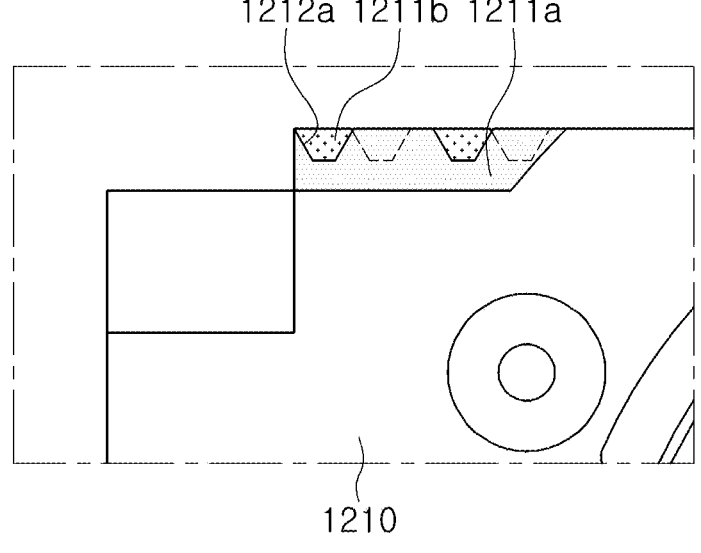
FIG. 30B is a front view of the lens barrel illustrated in FIG. 30A.

FIG. 30A is a perspective view illustrating another example of a portion of a lens barrel, and FIG. 30B is a front view of the lens barrel illustrated in FIG. 30A.

Referring to FIGS. 30A and 30B, a light blocking portion 1211 includes a first protrusion 1211a, a second protrusion 1211b, and a third protrusion 1211c protruding toward the cover from an upper surface of the lens barrel 1210. The first to third protrusions 1211a, 1211b, and 1211c are spaced apart from each other in a direction from a first end of the lens barrel 1210 facing the reflective member R to a second end of the lens barrel 1210 facing the image sensor 1400.

The first to third protrusions 1211a, 1211b, and 1211c respectively include at least one groove 1212a, 1212b, and 1212c extending in a direction in which light travels, i.e., an optical axis direction (the X-axis direction in FIG. 27). A position at which the groove 1212a is formed in the first protrusion 1211a in a direction perpendicular to the optical axis direction (the Y-axis direction in FIG. 27) is different from a position at which the groove 1212b is formed in the second protrusion 1211b in the direction perpendicular to the optical axis direction (the Y-axis direction in FIG. 27). In addition, the position at which the groove 1212b is formed in the second protrusion 1211b in the direction perpendicular to the optical axis direction (the Y-axis direction in FIG. 27) is different from a position at which the groove 1212c is formed in the third protrusion 1211c in the direction perpendicular to the optical axis direction (the Y-axis direction in FIG. 27).

More specifically, when the lens barrel 1210 is viewed in the direction in which light travels, i.e., in the optical axis direction (the X-axis direction in FIG. 27), the groove 1211b of the first protrusion 1211a is offset in the direction perpendicular to the optical axis direction (the Y-axis direction in FIG. 27) with respect to the groove 1212b of the second protrusion 1212a, and the groove 1212b of the second protrusion 1212a is offset in the direction perpendicular to the optical axis direction (the Y-axis direction in FIG. 27) with respect to the groove 1212c of the first protrusion 1211c.

Therefore, when viewed in the direction in which light travels, i.e., in the optical axis direction (the X-axis direction in FIG. 27), the groove 1212a of the first protrusion 1211a is blocked by a non-groove portion of the second protrusion 1211b, and the groove 1212b of the second protrusion 1211b is blocked by a non-groove portion of the third protrusion 1211c.

Figures 31A, 31B:
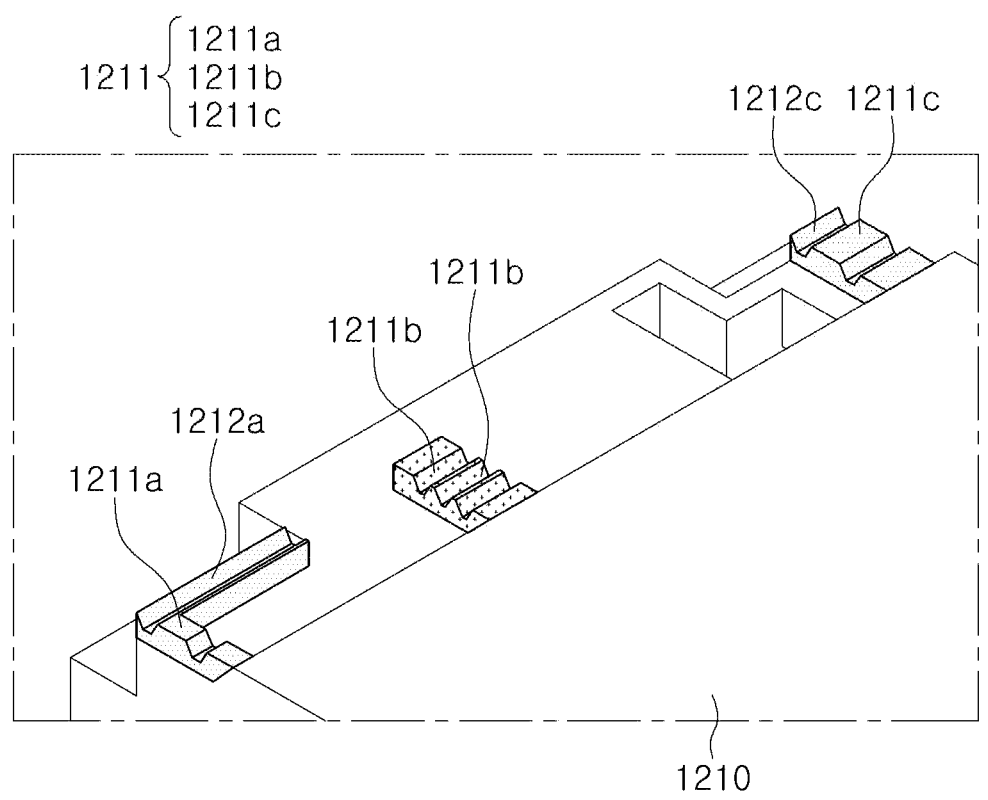
FIG. 31A is a perspective view illustrating another example of a portion of a lens barrel.
FIG. 31B is a front view of the lens barrel illustrated in FIG. 31A.

FIG. 31A is a perspective view illustrating another example of a portion of a lens barrel, and FIG. 31B is a front view of the lens barrel illustrated in FIG. 31A.

The example illustrated in FIGS. 31A and 31B differs from the example illustrated in FIGS. 30A and 30B in that the groove formed in one protrusion is only partially blocked by a non-groove portion of a neighboring protrusion.

When viewed in the direction in which light travels, i.e., in the optical axis direction (the X-axis direction in FIG. 27), the groove 1212a of the first protrusion 1211a is only partially blocked by a non-groove portion of the second protrusion 1211b, and the groove 1212b of the second protrusion 1211b is only partially blocked by a non-groove portion of the third protrusion 1211c.

If a cross-sectional area of the groove 1212a of the first protrusion 1211a s "A," a cross-sectional area of a portion of the groove 1212a of the first protrusion 1211a that is blocked by the non-groove portion of the second protrusion 1211b is smaller than "A. " Likewise, if a cross-sectional area of the groove 1212b of the second protrusion 1212a is "B," a cross-sectional area of a portion of the groove 1212b of the second protrusion 1211b that is blocked by the non-groove portion of the third protrusion 1212c is smaller than "B."

The examples of an optical imaging system described above enable a camera module having a relatively long focal length to be mounted in a thin portable electronic device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens, a second lens, a third lens, a fourth lens, and a fifth lens sequentially disposed in ascending numerical order along an optical axis of the optical imaging system from an object-side surface of the first lens toward an imaging plane of the optical imaging system, wherein the first lens has a positive refractive power and a convex object-side surface in a paraxial region thereof, the second lens has a negative refractive power, the third lens has a negative refractive power, a convex object-side surface in a paraxial region thereof, and a concave image-side surface in a paraxial region thereof, the fourth lens has a positive refractive power and a concave object-side surface in a paraxial region thereof, the fifth lens has a negative refractive power, the optical imaging system has a total of five lenses, $3.5 \leq$ TTL/IMG HT and $0 \leq$ D12/f $\leq 0.07$ are satisfied, where TTL is a distance along the optical axis from the object-side surface of the first lens to the imaging plane, IMG HT is one half of a diagonal length of the imaging plane, D12 is a distance along the optical axis from an image-side surface of the first lens to an object-side surface of the second lens, and f is a total focal length of the optical imaging system, and $|f1+f2|<2.0$ mm is satisfied, where f1 is a focal length of the first lens, and f2 is a focal length of the second lens.

2. The optical imaging system of claim 1, wherein $0.8 \leq$ TTL/f $\leq 1.25$ is satisfied.

3. The optical imaging system of claim 1, further comprising a reflective member disposed between an object side of the optical imaging system and the object-side surface of the first lens, wherein the reflective member comprises a reflective surface configured to receive incident light from an object and reflect the incident light toward the object-side surface of the first lens.

4. The optical imaging system of claim 3, wherein the first lens has two axes intersecting the optical axis and perpendicular to each other, and a length of one of the two axes is greater than a length of another one of the two axes, and $0<$ L1S1el/PTTL$<0.14$ is satisfied, where L1S1el is a maximum effective radius of the object-side surface of the first lens, and PTTL is a distance along the optical axis from the reflective surface to the imaging plane.

5. The optical imaging system of claim 3, wherein the first lens has two axes intersecting the optical axis and perpendicular to each other, and a length of one of the two axes is greater than a length of another one of the two axes, the first lens comprises:

an optical portion exhibiting a lens characteristic of the first lens; and a flange portion not exhibiting a lens characteristic of the first lens and extending from an edge of at least a portion of the optical portion in a direction away from the optical axis, and $0<$ AL1/(PTTL)$^2<0.05$ is satisfied, where AL1 is an area of the optical portion of the object-side surface of the first lens when the first lens is viewed in a direction of the optical axis, and PTTL is a distance along the optical axis from the reflective surface to the imaging plane.

6. The optical imaging system of claim 3, wherein $0<$ L2S1el/PTTL$<0.14$ is satisfied, where L2S1el is a maximum effective radius of the object-side surface of the second lens, and PTTL is a distance along the optical axis from the reflective surface to the imaging plane.

7. The optical imaging system of claim 1, wherein the first lens has two axes intersecting the optical axis and perpendicular to each other, and a length of one of the two axes is greater than a length of another one of the two axes, and $0.7 \leq$ L1S1es/L1S1el$<1.0$ is satisfied, where L1S1el is a maximum effective radius of the object-side surface of the first lens, and L1S1es is a minimum effective radius of the object-side surface of the first lens.

8. The optical imaging system of claim 1, wherein the first lens has two axes intersecting the optical axis and perpendicular to each other, and a length of one of the two axes is greater than a length of another one of the two axes, the first lens comprises:

an optical portion exhibiting a lens characteristic of the first lens; and a flange portion not exhibiting a lens characteristic of the first lens and extending from an edge of at least a portion of the optical portion in a direction away from the optical axis, the optical portion comprises:

a first edge and a second edge disposed on opposite sides of the optical axis in a first direction; and a third edge and a fourth edge disposed on opposite sides of the optical axis in a second direction perpendicular to the first direction, the third edge connects a first end of the first edge to a first end of the second edge, the fourth edge connects a second end of the first edge to a second end of the second edge, and a shortest distance between the first edge and the second edge is greater than a shortest distance between the third edge and the fourth edge.

9. The optical imaging system of claim 8, wherein $0°<\alpha<92°$ is satisfied, where $\alpha$ is an angle between a first virtual line connecting a connection point between the second end of the first edge and the fourth edge to the optical axis, and a second virtual line connecting a connection point between the second end of the second edge and the fourth edge to the optical axis.

10. The optical imaging system of claim 8, wherein $1.5<\alpha/$FOV $<3.0$ is satisfied, where $\alpha$ is an angle between a first virtual line connecting a connection point between the second end of the first edge and the fourth edge to the optical axis, and a second virtual line connecting a connection point between the second end of the second edge and the fourth edge to the optical axis, and FOV is an angle of view of the optical imaging system.

11. The optical imaging system of claim 1, wherein $0.8<$ BFL/(2*IMG HT)$<2.5$ is satisfied, where BFL is a distance along the optical axis from an image-side surface of the fifth lens to the imaging plane.

12. The optical imaging system of claim 1, wherein $0.2 \leq$ R1/f $\leq 0.6$ is satisfied, where R1 is a radius of curvature of the object-side surface of the first lens.

13. The optical imaging system of claim 1, further comprising a spacer disposed between the first lens and the second lens and comprising an opening through which light passes from the first lens to the second lens, wherein $0.7 \leq s1es/s1el < 1.0$ is satisfied, where s1el is a maximum radius of the opening when the opening is viewed in a direction of the optical axis, and s1es is a minimum radius of the opening when the opening is viewed in the direction of the optical axis.

14. The optical imaging system of claim 1, wherein the second lens has a concave image-side surface in a paraxial region thereof.

15. The optical imaging system of claim 1, wherein the fourth lens has a convex image-side surface in a paraxial region thereof.

16. The optical imaging system of claim 1, wherein the fifth lens has a concave image-side surface in a paraxial region thereof.

17. The optical imaging system of claim 1, wherein at least one lens among the first to fifth lenses has an aspherical surface.

*     *     *     *     *